(12) United States Patent
Urbanek et al.

(10) Patent No.: US 8,285,845 B2
(45) Date of Patent: *Oct. 9, 2012

(54) DISTRIBUTED USER VALIDATION AND PROFILE MANAGEMENT SYSTEM

(75) Inventors: Joe Urbanek, Austin, TX (US); Curtis Braswell, Austin, TX (US); Mary Ogden, Austin, TX (US)

(73) Assignee: Fisher-Rosemount Systems, Inc., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/053,683

(22) Filed: Mar. 22, 2011

(65) Prior Publication Data

US 2011/0173322 A1 Jul. 14, 2011

Related U.S. Application Data

(63) Continuation of application No. 11/496,680, filed on Jul. 31, 2006, now Pat. No. 7,921,201.

(51) Int. Cl.
*G06F 15/173* (2006.01)
*G06Q 10/00* (2012.01)
(52) U.S. Cl. .................. 709/224; 705/7.13; 705/7.15
(58) Field of Classification Search .......... 709/224; 705/7.13, 7.15
See application file for complete search history.

(56) References Cited

U.S. PATENT DOCUMENTS

| | | | | |
|---|---|---|---|---|
| 2003/0097342 A1* | 5/2003 | Whittingtom | ................ | 705/75 |
| 2003/0216943 A1* | 11/2003 | McPhee et al. | ................ | 705/3 |
| 2004/0064329 A1* | 4/2004 | Broad et al. | ................ | 705/1 |
| 2005/0049916 A1* | 3/2005 | Tracht | ................ | 705/14 |
| 2005/0216313 A1 | 9/2005 | Claud et al. | | |
| 2005/0251435 A1* | 11/2005 | Paolella et al. | ................ | 705/8 |
| 2006/0015930 A1 | 1/2006 | Shoham | | |
| 2006/0172274 A1* | 8/2006 | Nolasco | ................ | 434/350 |
| 2006/0235732 A1* | 10/2006 | Miller et al. | ................ | 705/7 |

FOREIGN PATENT DOCUMENTS

EP 1 134 644 9/2001
WO WO-03/050742 A1 6/2003

OTHER PUBLICATIONS

Great Britain Search Report for Application No. GB0714836.4, dated Nov. 15, 2007.
First Office Action for Chinese Application No. 200710137682.0, dated Jun. 22, 2011.
Office Action for U.S. Appl. No. 11/496,680, dated Mar. 29, 2010.

* cited by examiner

*Primary Examiner* — Minh-Chau Nguyen
(74) *Attorney, Agent, or Firm* — Marshall, Gerstein & Borun LLP

(57) ABSTRACT

A distributed user validation and profile management system operates to automatically validate and update user profiles, such as those stored within an organizational security database, to properly reflect the actual positions and rights of various users within the organization to the various organizational assets, such as computer implemented applications. The user validation and profile management system periodically sends validation e-mails to various users within the organization to initiate the process of updating and verifying user profile information. The individual users may respond to the validation e-mails to verify their position and status within the organization as well as the position or status of one or more closely associated users, such as a manager or a subordinate. Failure of the user to respond to the validation e-mail causes the user validation and profile management system to determine that the user profile is invalid when the user attempts to access an application.

37 Claims, 21 Drawing Sheets

FIG. 5

Assumptions
- User in VGrp 2 validates on March 7

Assumptions

- Last validation period was February 15– February 28
- VGrp 1 was sent February 15
- The Manager validated on February 19, 2006
- The Director Report validated on February 23, 2006
- Current Validation period is March 1– March 14
- VGrp 2 is sent

Assumptions
- Current validation period is April 1-14
- Today is April 3
- User in VGrp 2
- VGrp 2 was sent on March 15
- Last validation period was March 15– March 29

Validation Status
- VSet 1 = VALID
- Received Date < Sent Date and
- Today is within VSet 1's validation period

- VSet 2 = INVALID
- Received Date < Sent Date and
- Today is not in VSet 2' validation period

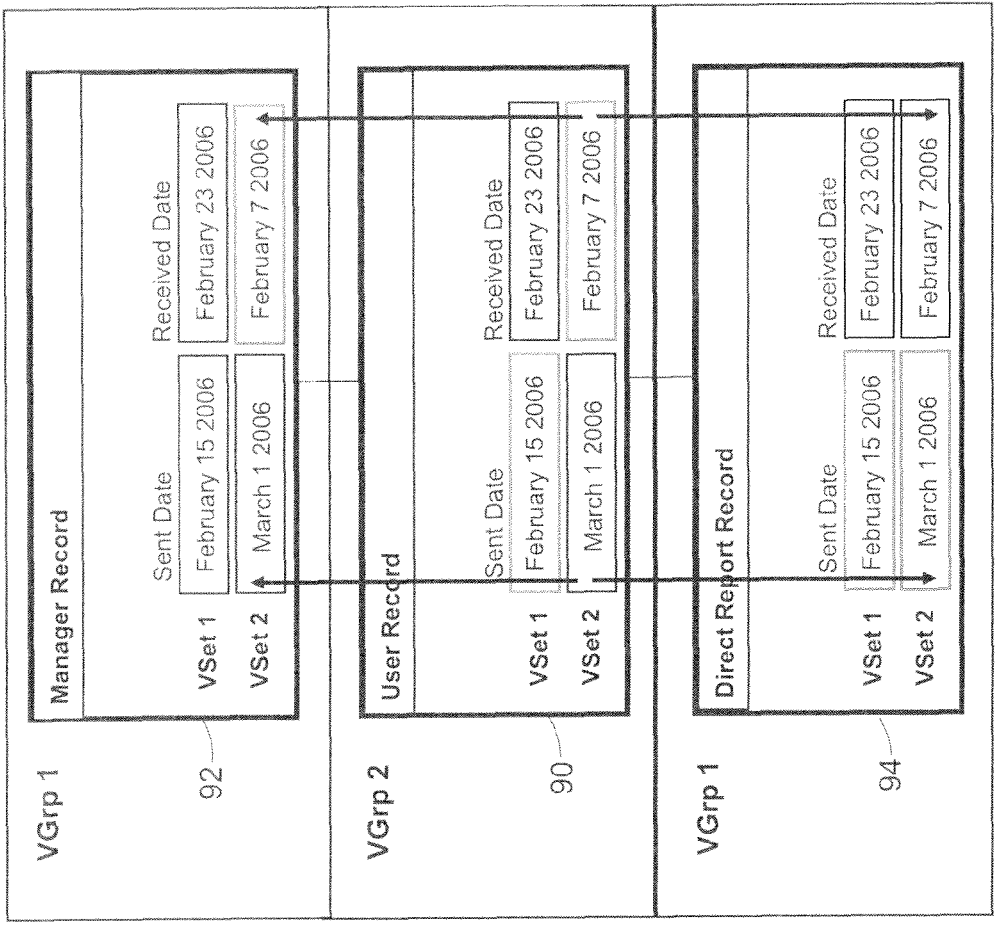

FIG. 11

Assumptions
- User is in VGrp 2
- Last validation period was February 15 – February 28
  VGrp 1 was sent
- Either the Manager or a Direct Report validated on February 23
- Current Validation period is March 1 – March 14
- VGrp 2 was sent
- User last validated February 7
- Today is March 10

Validation Status
- VSet 1 = VALID
- Rule "Received Date > Sent Date"
- VSet 2 = VALID
- Received Date < Sent Date and
- Today is in the VSet 2's validation period

Joe Urbanek - Sr. Vp Sales Operations Emerson Process Management - Austin
- Gene Fournier   Manager, Media Services Emerson Process Management - Eden Prairie
- Mark King   Director, Sales Business Systems and Processes Emerson Process Management - Austin
- Mary Ogden   North American Admin Emerson Process Management - Austin
  - Alan Johns Web Administrator/Manager Emerson Process Management - Austin
  - Curtis Braswell Application Development Manager - Global Sales Emerson Process Management - Austin
  - ELC Test 1 ELC Test 1 Title Process Solutions - Austin
  - ELC Test 3 ELC Test 3 Title Asset Optimization - Austin
  - Fred Askew Technical Writer Emerson Process Management - Austin
  - Gena Robertson Skillsoft Consultant Emerson Process Management - Austin
  - Kevin Warner Contractor Emerson Process Management - Austin
  - Merlin Helpdesk Merlin Help Desk Emerson Process Management - Austin
    - Derrick Panares Helpdeak Emerson Process Management - Austin
  - PMO Testuser PMO Test User Emerson Export Engineering (EEEC) - Pune
  - Stacy Crowley Sales & Marketing Analyst Emerson Process Management - Austin
  - Steve Ziejewski eCommerce Business Manager Emerson Process Management - Austin
  - Test ELC 2 ELC Test 2 Title Emerson Process Management - Austin
- Nelson Norden Director Business Development Emerson Process Management - Austin Assumptions
- Email sent to VGroup 2
- User is in VSet 2
- Sent Dates for VSet 2 in VGrp 2 are linked to Sent dates for VSet 2 in VGrp 1
- Sent date is March 10 2006

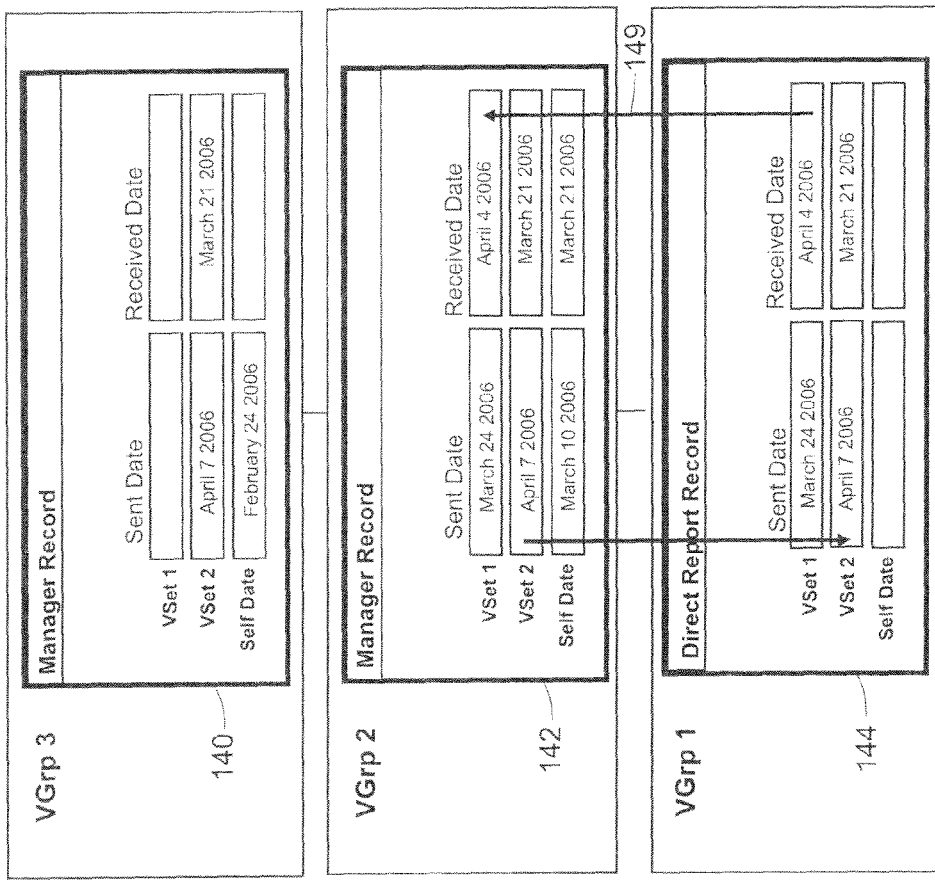

DISTRIBUTED USER VALIDATION AND PROFILE MANAGEMENT SYSTEM

CROSS-REFERENCE TO RELATED APPLICATION

This is a continuation application which is based on and claims priority to U.S. patent application Ser. No. 11/496,680, entitled "Distributed User Validation and Profile Management System," which was filed on Jul. 31, 2006, the entire disclosure of which is hereby incorporated by reference herein.

TECHNICAL FIELD

This patent relates generally to a computer security system, and more particularly to security related to computer resource management and electronic portal access systems.

BACKGROUND

Many typical computer networks, such as those associated with corporations or other organizations, are used to enable various users (who are typically employees, consultants or other persons working with or for the organization) to have access to one or more computer networked applications which are part of the organization's resources. The computer applications may include typical word processing, spreadsheet, presentation, e-mail, relationship management applications or other types of generic applications, which may or may not have particularized security features associated therewith. The applications provided as part of the organizational resources may additionally or alternatively include various organization specific or organizationally sensitive applications such as accounting applications, planning and marketing applications, resource management applications, training applications, employee management and human resource applications, and other types of applications provided within or as part of the organization to perform various and different tasks useful for some reason for the functioning of the organization. In many cases, these applications have security features associated therewith so that only some of the users associated with the organization have access to the applications or so that some users have only limited access to the application, depending on the user's position, job, title, department, function, etc. within the organization. Thus, in many cases, each user is provided with access to only a limited number of applications used within the organization, and may be provided with only limited access rights or privileges to some or all of the applications accessible by the user.

While managing access by users within an organization to the various applications provided by the organization can be accomplished fairly easily when the organization is small or made up of a single coherent entity, managing user access to various organizational computer assets can become a daunting, time-consuming and tedious task in larger organizations, as larger organizations typically have more users accessing the applications and more applications associated with different tasks or functions within the organization. Larger organizations also, many times, have third party companies or entities who act as partners or representatives to the organization and who thus must have some type of access to the computer applications of the organization. Moreover, employment changes within larger organizations occur more often and are generally not centralized, sometimes making these changes go unreported or unnoticed at higher levels of the organization. In the past, therefore, it has been a cumbersome and somewhat tedious task to track and update (i.e., keep current) the access privileges to be provided to the various users of the organization with respect to each of the organizational computer network assets. In some cases, each separate application on a computer network associated with the organization manages its own list of the users who are able to gain access to the application, and the amount or level of access available for each such user. While this feature provides for a high level of security, it becomes very unwieldy and hard to manage in large organizations, as the access privileges have to be changed on an application by application basis any time a user leaves or joins the organization, and in some cases, any time a user changes positions or roles within the organization. In larger organizations, with a larger number of users and/or a large number of applications, personnel turnover and changes may occur frequently, making it difficult or time consuming to update the security access features of each of the applications.

To overcome this problem, organizations, and more typically large organizations having a large number of applications and/or a large number of employees, set up an organizational wide user profile system which defines, for each user, the identity of the user as well as information about the user, including information defining the various applications and possibly the access or security levels within various applications to which the user should have access. Thereafter, when a particular user attempts to log onto or access an application, a security system associated with the application uses the user profile to determine whether that particular user has the proper qualifications or security to in access to and use the application, either at all or at the requested access level. However, it is still necessary to keep the user profiles up-to-date and accurate so as to prevent users who have left the organization from being able to access the organizational applications, or to ensure that employees who change positions within the organization have the correct access privileges to the applications based on their current position.

As will be understood, changes to the user profiles typically need to be made when an employee leaves the organization, so as to terminate access to all the applications immediately. Additionally, changes to the user profiles may also need to be made when there is a change in a particular employee's position within the organization, as access rights to particular applications and to the specific content within an application is generally determined by one or more attributes of a user's profile, for example, the office ID, division, department, job title, function, skill level, or world area location of the employee. Thus, in many cases, any relevant change to the user's position must be recorded or reflected in the user profile used by the application security, system immediately, so that the user's access to content may be reviewed and updated if necessary.

Traditionally, organizations have provided a particular and typically centralized group or department within the organization, such as the human resources (HR) department, the information technology (IT) department, or some other department or group, with the primary responsibility for updating the user profiles used by the application security system to assure correct user access to the organizational applications as employees leave or change positions within the organization. However, especially for larger organizations, the process of manually updating the user profiles at a centralized location or by a particular department can become very tedious and time consuming for those assigned to perform this task. Furthermore, the process of updating user profiles by a group not intimately involved with the users whose profiles are being changed may be fraught with errors and delays. Additionally, with a third party representative, the organization is most like never to know when a user leaves or changes their profile. In particular, in many instances, the HR or IT department is not properly or uniformly informed of changes within the organizational structure that might require changes to one or more user profiles, such as changes in organizational responsibilities, movement of persons within and between departments of the organization, changes in manager/subordinate relationships in various departments of the organization, etc., any or all of which might necessitate a change to the access rights of the particular users effected by the organizational changes. Still further, in large organizations or in organizations with high turnover rates or third party affiliates, the amount of creation and changing of user profiles which occurs due to normal attrition can become quite time consuming and tedious, and is typically a function that is not adequately attended to at scheduled or periodic times due to the ease in which this function can be ignored within the organization. These scenarios may thus lead to a back-log in removing, updating or changing user profiles to adequately reflect the proper information about different users, which changes are needed to assure the correct access to applications or computer network facilities within the organization.

Unfortunately, the failure to provide for the correct security or access privileges to the networked assets of the organization in a timely manner can become, in some instances, quite serious. In particular, improper or untimely updating of the user profiles can lead to the release of trade secrets, confidential technical, marketing and sales information, confidential personal information stored in personnel files, etc., as these lapses in security may be exploited by disgruntled or unscrupulous employees who have left the organization or who have changed positions within the organization, all to the significant detriment of the organization.

SUMMARY

A distributed user validation and profile management system operates to automatically validate and update user profiles, such as those stored within an organizational security database, to properly reflect the actual positions and rights of various users within the organization to the various organizational assets, such as computer implemented applications. The user validation and profile management system described herein includes a user validation engine which periodically sends notifications in, for example, the form of e-mails, to various users within the organization to initiate the process of validating and updating user profile information. The individual users may respond to the validation e-mails by, for example, accessing or using an electronic link provided within the validation e-mails to verify their position and status within the organization. In one embodiment, the users verify that they are still employed by or are associated with the organization in the same capacity as provided in their user profile currently on record. Failure of the user to respond to the validation e-mail causes the user validation and profile management system to determine that the user profile is invalid when the user attempts to access an application, which thereby prevents the user from being able to access or use networked applications within the organization.

Additionally, in another embodiment, particular users may, or in some cases must, verify or validate the status of one or more other users within the organization, such as supervisors or direct reports of the particular users, referred to herein as users closely associated with the particular users. This feature assures that the status of any particular user (and thus the user profile for that user) is verified by both the particular user and a person within the organization closely associated with the particular user, such as a manager or a subordinate of the particular user. Failure of one or more of the closely associated users to verify the particular user will cause the user profile of the particular user to be deemed invalid, and thus will prevent the particular user from being able to access the networked assets of the organization.

Moreover, to prevent the user validation and profile management system from sending an overbearing number of e-mails to any particular user, or from becoming tedious to the users, the validation system alternates between groups of users who receive the validation e-mails, so that users do not have to verify themselves and their closely associated users during every validation period. In one embodiment, the user validation and profile management system only sends a validation e-mail to any particular user every other validation period. Thus, as an example, during a first validation period, the user validation system may send an e-mail to only a first half of the users within the organization, requiring that the first half of the users, to whom the validation e-mails are sent, to validate themselves and one or more other closely associated users in the second half of users, i.e., the half of users to whom the validation e-mail is not being sent. Thereafter, during the next validation period, the validation system sends validation e-mails only to the second half of the users requiring each of the second half of the users to validate themselves and possibly one or more closely associated users within the first half of the users who are not receiving validation e-mails in the second validation period. In this manner, the validation system updates or validates each user profile twice as often as any particular user has to respond to a validation e-mail.

As will be understood, the user validation system described herein provides for automatic checks on the self validation of users by having closely associated users validate one another every other validation period. In this manner, while a particular user who leaves the organization or changes positions within the organization (but who still has access to organizational network) may be able to validate themselves during the first validation period after the change, the particular user will still become invalidated when the closely associated users defined for the particular user (such as the particular user's manager or subordinate) needs to validate the particular user during the second validation period after the change, as the users closely associated with the particular user will know that the particular user should no longer be validated and will refuse to do so in response to the validation e-mail.

Thus, the user validation and profile management system described herein provides for an automatic method of having users validate themselves as well as other closely associated users within the organization, to provide for an automatic, continuous and regularly updated user validation procedure, which provides more security and better assures proper access to the various organizational networked facilities, all without the need of a particular group, such as the HR department, to initiate, oversee or manually enter user profile changes, although in some cases, an administrator may need to oversee user profile changes. Moreover, the validation system described herein alternates the verification task during successive validation periods so that the validation system can update and verify each of the user profiles more often than any particular user has to be involved in updating or verifying themselves within the system. This system therefore provides more accurate and faster, or at least more regular, verification of user profiles, and implements a procedure that prevents users from being able to game the system to continue to have access to organizational assets when they no longer should based on changes within their position within the organization. Moreover, the validation system may also be easily used to define and update an organizational chart illustrating the manager/subordinate relationships within the organization based on the relationships used to define the various validation groups used by the validation system.

BRIEF DESCRIPTION OF THE DRAWINGS

The present patent is illustrated by way of examples and not limitations in the accompanying figures, in which like references indicate similar elements, and in which:

FIG. 5 depicts a screen display associated with a validation page used to validate one or more users within the system of FIGS. 1 and 2;

FIG. 11 illustrates three user records for closely associated users related to a third example of determining the validity or invalidity of the user profiles related to these user records;

FIG. 12 illustrates a depiction of an organization chart or hierarchy created from user profiles indicating manager/subordinate relationships between users;

FIG. 21 illustrates three user records for closely associated users having three validation fields and related to an example of determining the validity or invalidity of user profiles associated with these user records at a fourth time.

DETAILED DESCRIPTION

Figure 1:
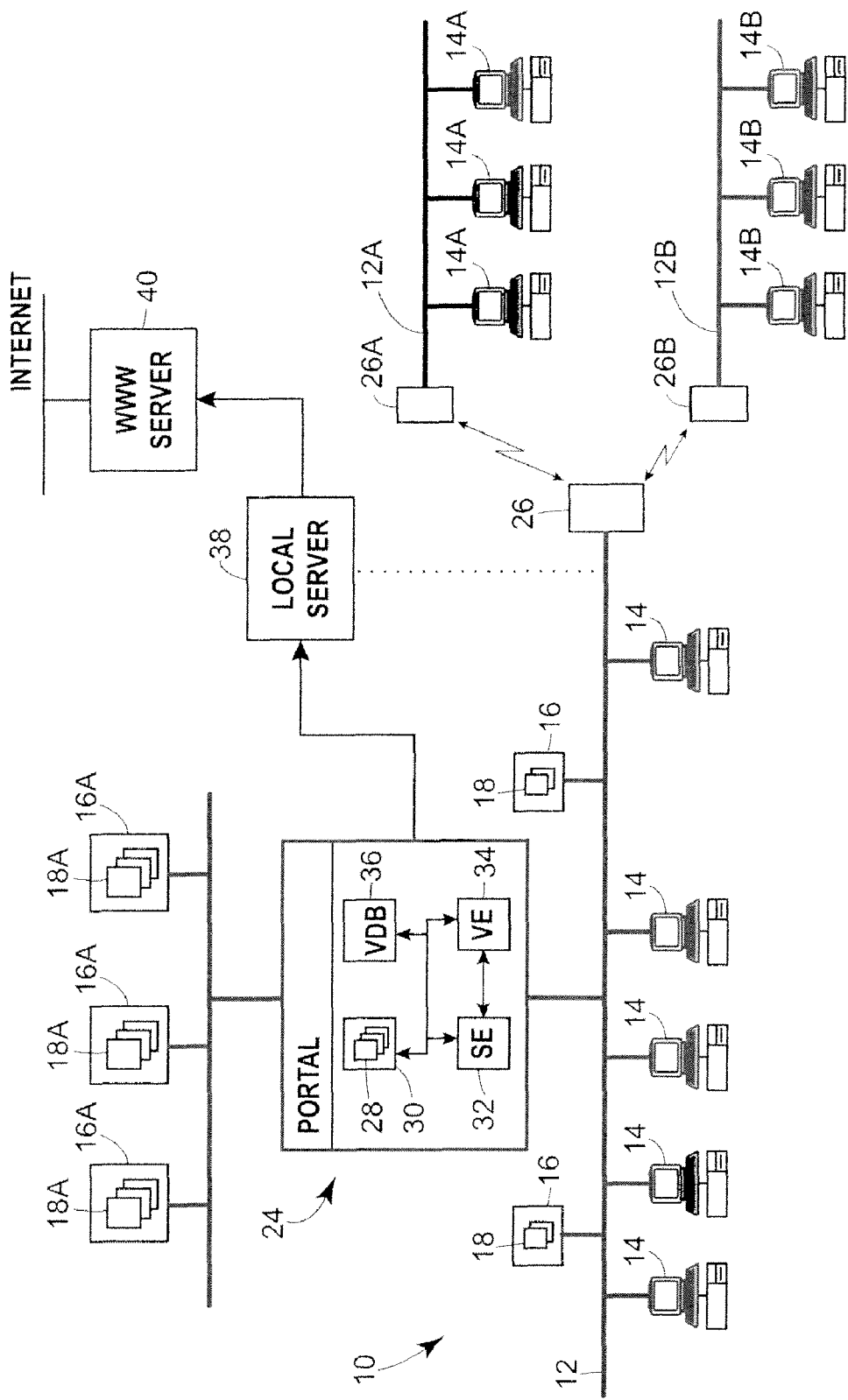
FIG. 1 is a block and schematic diagram of a computer network associated with an organization, including multiple user applications, multiple user interface devices and a user validation and profile management system.

Referring now to FIG. 1, a computer network system 10 associated with an organization, such as a corporation, a not-for-profit entity, a firm, a government, a governmental entity, or any other organizational entity, is illustrated in block diagram form. As illustrated in FIG. 1, the computer network system 10 includes a local area network (LAN) 12 which communicatively connects various different types of computer hardware devices in a networked manner. In particular, the computer network system 10 is illustrated as including a number of user workstations or user interfaces 14 through which various different users associated with the organization can access the computer facilities networked via the LAN 12. Additionally, various computers 16, such as servers, databases, application stations, etc. are communicatively connected to the LAN 12 and are used to store and execute one or more applications 18. Moreover, as illustrated in FIG. 1, applications 18A are stored in computers 16A which are connected to the LAN 12 via a portal or security server device 24, which may coordinate or perform user validation with respect to the applications 18A and/or the applications 18 if so desired.

Generally speaking, the users may implement or may access the applications 18 and 18A using one of the workstations 14. Of course, the applications 18 and 18A can be any desired types, kinds, brands, etc. of applications including, for example, accounting applications, financial applications, human resource applications, resource management applications, training applications, inventory applications, maintenance applications, marketing and sales applications, design applications, or any other applications used by or useful within the organization. Moreover, while various ones of the users at the workstations 14 can access any of the applications 18 and 18A via the LAN 12, if desired, the applications 18 and 18A may be downloaded to and executed within the workstations 14 in any desired manner or may be originally stored within the workstations 14.

Still further, the LAN 12 may be connected through nodes 26, 26A and 26B to provide access to organizational assets in different geographical locations to provide, for example, access to networked assets associated with different departments, affiliates or other entities within, associated with or that make up the organization. Thus, as illustrated in FIG. 1, user interface computers 14A and 14B may be connected to LANs 12A and 12B and may be associated with offsite facilities or facilities that are physically located away from the facility in which the workstations 14 are located. The interface computers 14A and 14B may be connected to the LAN 12 through the nodes 26, 26A and 26B using any type of communication network including a wide area network (WAN), satellite communications, the Internet, a private network, etc. Additionally, while not shown in FIG. 1, additional applications 18 and 18A may be stored on computer devices or facilities connected to the communication networks 12A and 12B. In this manner, the computer network system 10 is not limited to a single site, but can include multiple sites interconnected through any desired types of communications structures, including public networks or private networks, LANs, WANs, etc.

As illustrated in FIG. 1, the portal 24 is connected to the LAN 12 and is used to store a number of user profiles 28 in a profile database 30, it generally being the case that there is at least one user profile 28 for each of the various users associated with the organization or at least for each user which is to have access to any of the applications 18 and/or 18A associated with the computer network system 10. During operation, the portal 24 implements a security routine or a security engine 32 which limits access to the applications 18 and/or 18A based on the user profile 28 associated with a particular user by determining whether the particular user has the proper authority to access or run the application 18 or 18A and, if so, the amount or level of access that the user should have to the application 18 or 18A.

Importantly, the portal 24 includes a user validation and profile management system having a verification engine 34 and a verification database 36 which operate to automatically validate a user profile for a user when, for example, the user attempts to gain access to one of the applications 18 or 18A. Moreover, as will be described in more detail herein, the user validation and profile management system may operate to enable users to update the user profiles 28 within the user profile database 30 based on changes within the organization, such as the hiring of new users, users leaving or changing positions within the organization, users accepting new or different responsibilities, moving to new or different functions or positions within the organization, etc., any of which actions may operate to redefine the user's relationship with the organization and thus the type of access to which the user should be provided to the applications 18 or 18A.

To perform these functions, the user validation and profile management system includes a validation engine 34, a validation database 36, a local server 38 (which may be an e-mail and web server) and, in some cases, a public server 40, such as an e-mail server connected to the Internet or the World Wide Web. As illustrated in FIG. 1, the local server 38 may be connected to the various workstations 14 through the LAN 12 to send e-mails via an intranet provided within the organization, and additionally may be connected to the public server 40, which may be an Internet server or other public network server, to send e-mails addressed outside of the organization, or to send e-mails which must be sent via a public communication network to users associated with the organization. As will be described in more detail hereinafter, the validation engine 34 generates validation notifications (preferably in the form of e-mails) to be delivered to various users via the local server 38 (and/or possibly the public server 40) to initiate a process for validating and updating the user profiles 28 stored within the user profile database 30.

During use, the portal 24 uses the user validation and profile management system to provide users logged onto one or more of the user interfaces 14 with access to the applications 18 and/or 18A and additionally implements an automatic and periodic user validation procedure. In particular, in one embodiment, the user validation and profile management system operates as part of the portal 24 providing access by one or more users to one or more of the applications 18A. In this case, when a user logs onto the portal 24 and selects an application 18A to access, the security engine 32 first checks to determine if the user profile 28 for the user, as stored in the user profile database 30, is valid based on validation information stored within the validation database 36. If the user profile 28 for the user is currently valid, the portal 24 provides access to the application 18A. As part of this process, the application 18A or the security engine 32 within the portal 24 may determine a level of security or access to which the user is provided based on the specifics of the user profile 28 for that user or based on other information stored within the application 18A.

Figure 2:
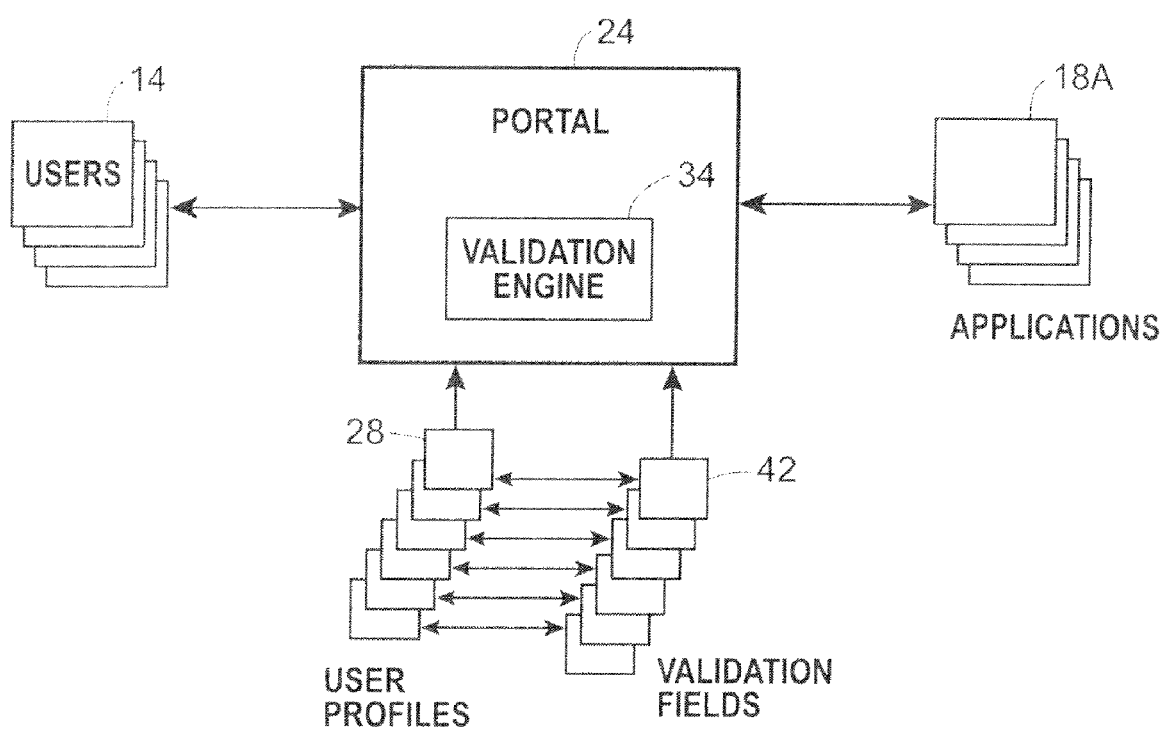
FIG. 2 is a block diagram illustrating the operation of the user validation and profile management system within the network of FIG. 1.

FIG. 2 illustrates, in block diagram form, one manner in which the security engine 32 and the user validation and profile management system logically interact with one or more of the users 14 and with the applications 18 and/or 18A to implement a user validation process. In particular, when a user at one of the workstations 14 attempts to access an application 18A, the validation engine 34 first determines whether the user profile 28 for that user is valid. As illustrated in FIG. 2, in one embodiment, each user profile 28 includes an associated set of validation data 42 (stored in the validation database 36 of FIG. 1) which is used by the validation engine 34 to determine the validity of the user profile 28. Each set of validation data 42 may include two validation fields which store dates associated with the validation e-mails previously generated by the validation system, and the validation engine 32 uses these fields to determine if a particular user profile 28 is currently valid based on predetermined validation rules. If the user or the associated user profile 28 is valid, then the user is provided access to the application 18A, based on the specifics of the user profile (e.g., if the user profile 28 has data indicating that the user should have access to the application 18A). Moreover, any application 18A may store its own security or access information or may use the user profile 28 to determine the level of access to be provided to the user by the application 18A. If the user profile 28 is determined to be invalid, then the user is denied access to the requested application 18A. It should be noted, however, that a user profile 28 may indicate that the associated user has access rights to a particular application 18A (e.g., that the user has the right job title, function, etc. for such access), but still may be determined to be invalid based on the validation data stored in the validation database 36. In this case, the security engine 32 within the portal 24 will not provide the user with access to the desired application because it has been determined that the user profile is invalid, no matter what data is stored within the user profile.

Generally speaking, the user validation system 30 automates the collection, verification, and distribution of user profile information by providing for automated user registration, a user profile management interface and periodic communication and profile validation activities via e-mail and/or web activities with each user, each user's manager and one or more direct reports or subordinates of each user. In particular, the validation system 30 uses collected and stored information regarding organizational relationships between a user and one or more associated users, such as the user's manager and the user's direct reports, to create an organizational tree, and allows a user to validate, indicate a transfer, or terminate himself or herself and anyone directly connected to him/her on the organization tree.

As noted above, a user interface to the validation system may be a portal application which, in addition to performing the security features discussed above, provides a central point of login for accessing applications 18A and, if desired, applications 18, whose users are to be validated and maintained by the system. As will be seen, user profile validation is accomplished via e-mail messages and web page logins in a manner that does not depend on input regarding employee status being sent from or to any specific department within the organization or an affiliate of the organization, e.g., the HR department, the IT department, etc.

Moreover, the user profile validation occurs regularly and periodically once the validation system is put into place, as the validation system automatically and periodically requires the users themselves to update the validation data 42 within the validation database 36. To implement the validation system, the system itself, or a configuration person first defines two or more different groups of users, called validation groups, wherein each user falls within one and only one of the validation groups. In one embodiment, the validation system 30 uses only two different validation groups or Vgrps to perform user profile validation, although more groups could be used in other embodiments. In the case of two validation groups, the validation groups may be determined by first defining, for each user, the user's manger(s) and any direct report(s) or subordinate(s) for the user. These defined relationships, de facto, define a user organizational chart. Then, based on the organizational chart, each user is defined or assigned to one and only one of the two different validation groups.

Figure 3:
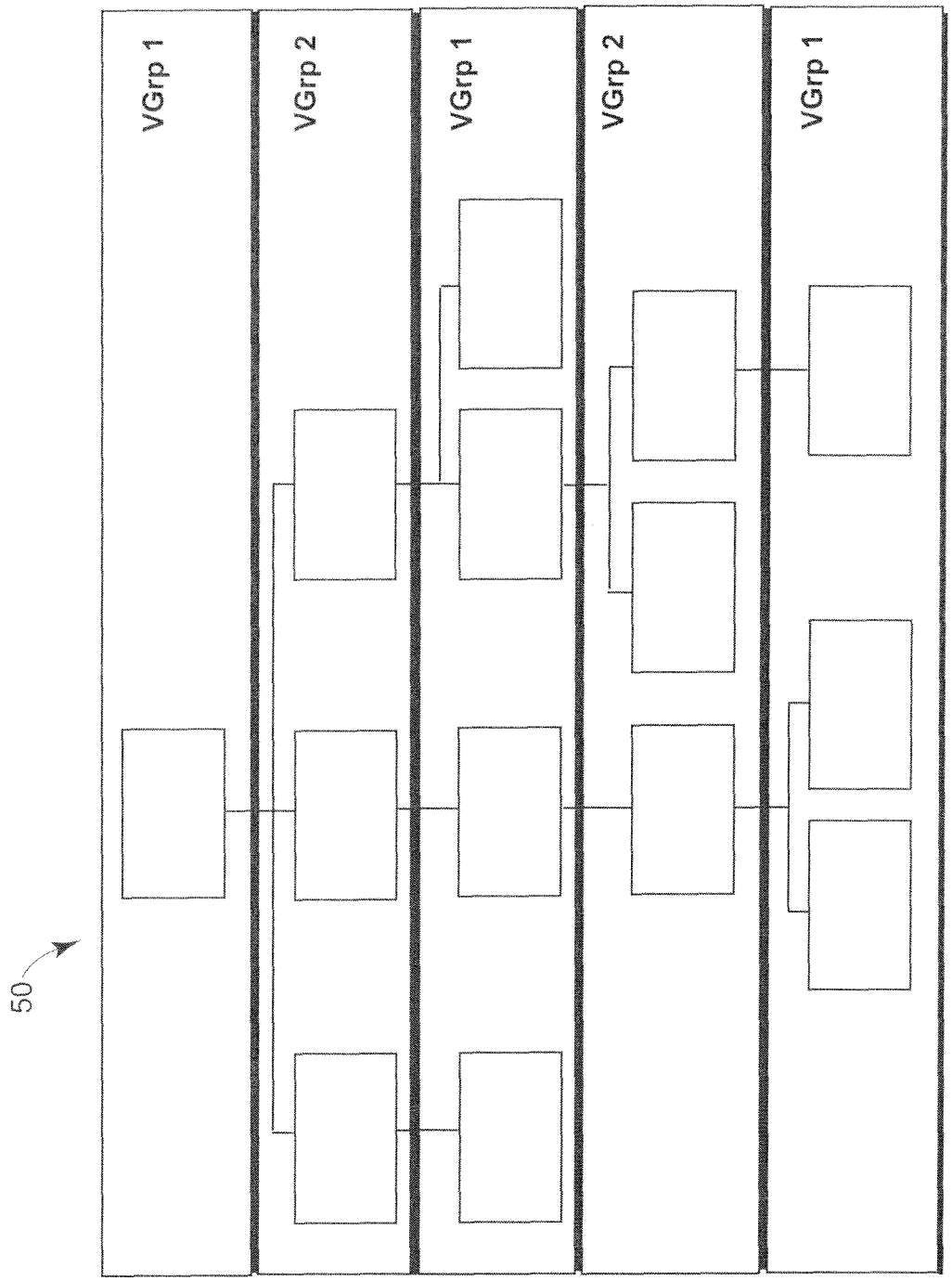
FIG. 3 is a depiction of an organization chart or hierarchy used to define multiple validation groups for the user validation and profile management system of FIGS. 1 and 2.

FIG. 3 illustrates an organizational tree 50, wherein two validation groups or VGrps are defined as VGrp 1 and VGrp 2. As illustrated in FIG. 3, the validation groups may be determined by first building a hierarchical tree based on the manager/user/subordinate relationships within the organization, which relationships may be collected initially during registration and thereafter either by the validation process itself or through profile updates made by the users. When the organizational tree 50 is determined, the two validation groups VGrp 1 and VGrp 2 are defined as alternating levels in the tree, as illustrated in FIG. 3. As will be understood, each box in the tree 50 of FIG. 3 is associated with a single user, while a box above and connected directly to a user depicts the user's manager and each box below and connected directly to the user depicts a user's subordinate or direct report. As shown in FIG. 3, alternating levels on the tree 50 are provided or associated with different ones of the validation groups VGrp 1 and VGrp 2. Once the validation groups are defined for an organization, these groups may be stored in the validation database 36 (shown in FIG. 1) or in any other database or memory if so desired.

After the validation groups are define, the validation engine 34 sends out a set of validation notifications, preferably in the form of e-mails, to users in one of the validation groups (called the target group) every validation period, which will be defined in this example as every two weeks. The purpose of the validation notifications is to prompt users to provide verification that they and possibly one or more other users within the organization are still valid users. In one embodiment, the target group changes or alternates between the validation groups every validation period. Thus, for example, if validation e-mails are sent to VGrp 1 on January 2 for the first validation period, then validation e-mails are sent to VGrp 2 on January 16 for the second validation period and validation e-mails are then again sent to VGrp 1 on January 30 for the third validation period, and so on. Of course, the validation period is not restricted to two weeks, and can instead be set to a greater or lesser time interval that best fits the needs of the organization. As will be understood, the user validation system validates each user every two weeks (or whatever the validation period is set to), but does so in a manner in which any particular user only receives a validation e-mail once every four weeks (or twice the amount of time to which the validation period is set).

Once a validation e-mail is sent to the target group for a current validation period, the validation system requires each user in the target group to validate themselves, and the user(s) directly connected above them in the organizational tree 50 (typically their manager) and the user(s) directly below them in the organizational tree 50 (typically any direct reports or subordinates). Thus, when a user completes validation, he/she has effectively validated themselves, their manager(s), and any direct reports or subordinates for the current validation period. Because two users who are directly connected on the organizational tree 50 will generally never be assigned to the same validation group, these users will not receive a validation e-mail at the same time or during the same validation period, meaning that users connected directly to each other on the organizational tree 50 (who presumably have the best information about changes in each others' employment status) will validate each other, thereby providing for a more accurate and secure validation process. Additionally, users directly connected to each other at different levels of the organizational tree 50 will only need to receive a validation e-mail once during any two consecutive validation periods, in this example, once every four week period. However, because the users in VGrp 1 validate the users in the VGrp 2 above and below them on the organizational tree 50, and vice-versa, actual validation of each user is performed during each validation period, i.e., during each two week period.

While the following discussion provides one example of a manner in which validation e-mails may be used to update the validation database 36 to enable regular and timely validation of users within an organization, it will be understood that the specifics described herein may be changed or altered in many ways to implement the user validation and profile management system described herein.

Figure 4:
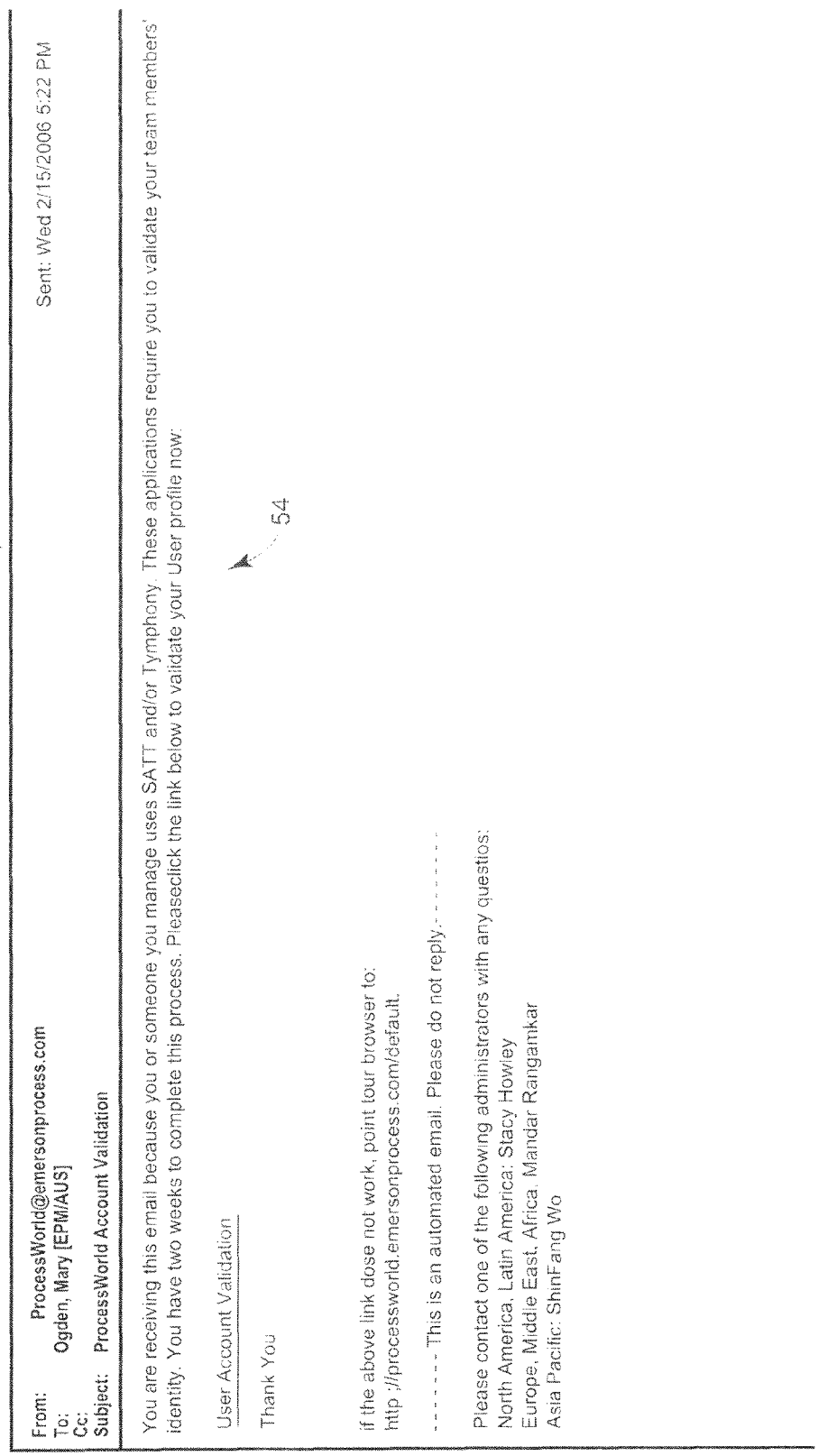
FIG. 4 is an exemplary display screen illustrating a validation e-mail which may be sent by the user validation and profile management system of FIGS. 1 and 2.
Figure 5:
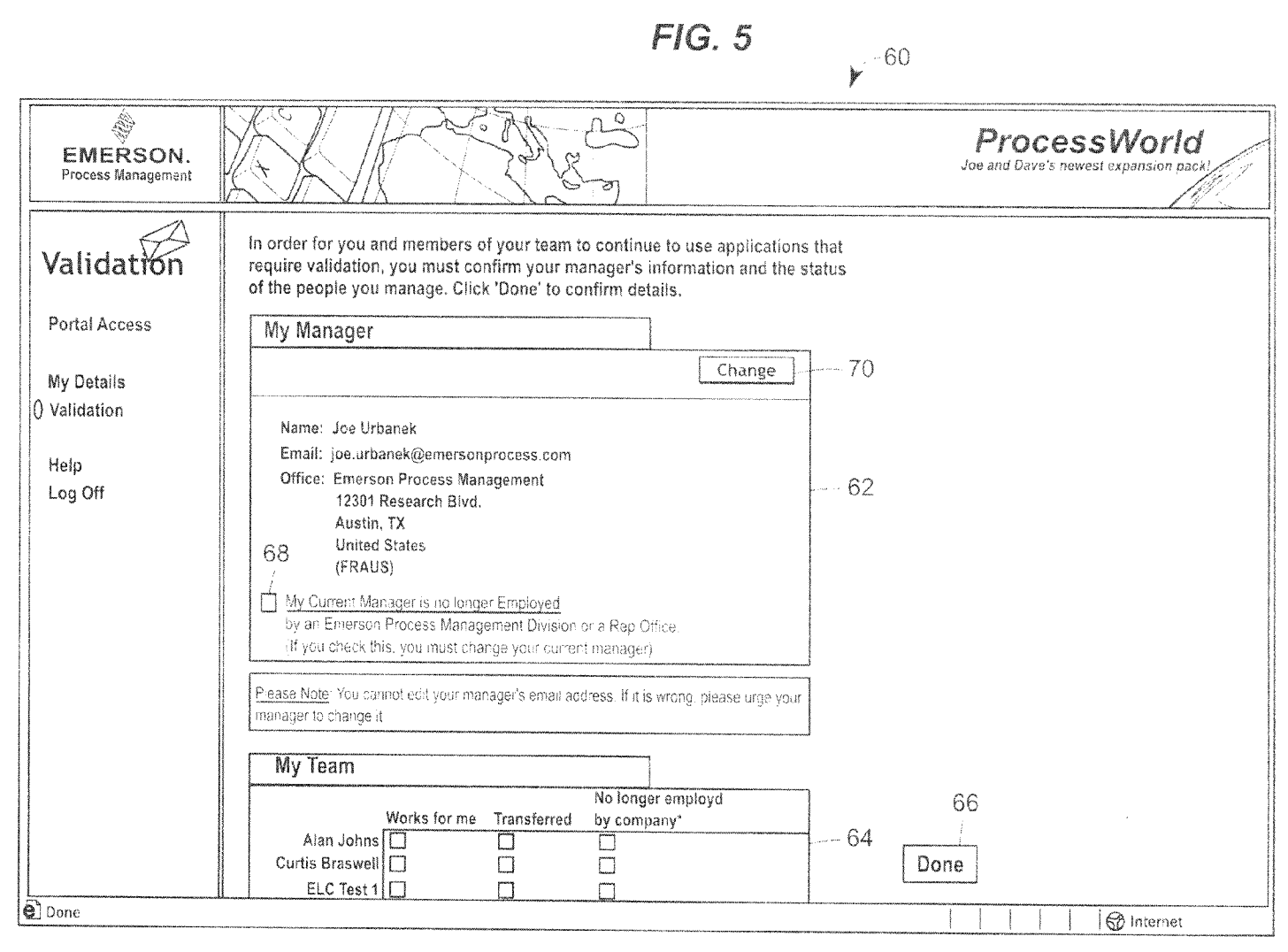
Figure 6:
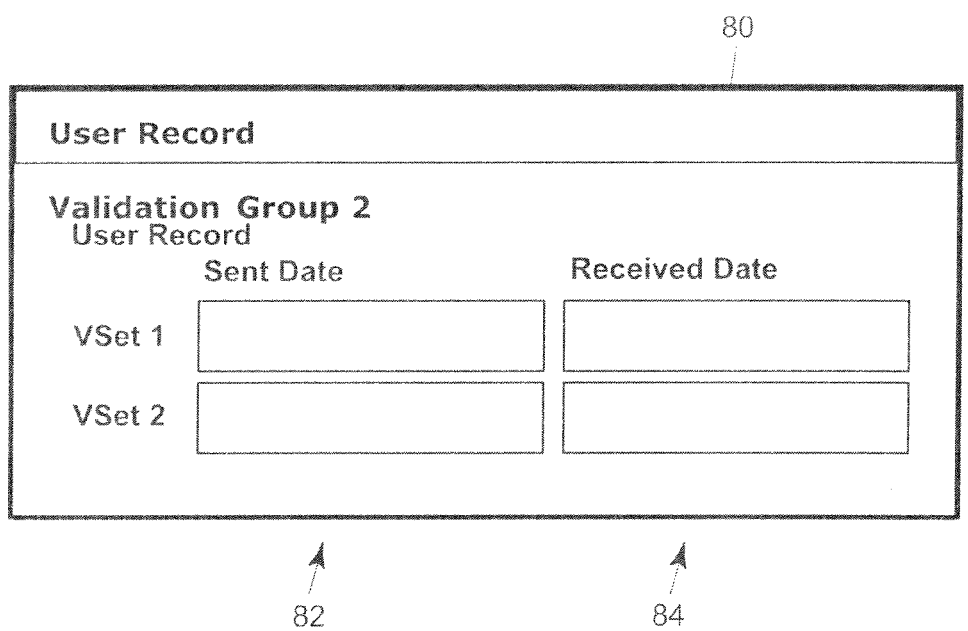
FIG. 6 illustrates an example user record having two sets of validation fields for determining the validity of a user profile.

FIG. 4 displays a screen showing one example of a validation e-mail 52 which may be sent to a user to initiate the validation process by which the user validates himself or herself and possibly one or more other users. As illustrated in FIG. 4, the validation e-mail 52 may contain a brief message 54 about the validation process, along with a link 56 to the validation system. If desired, the link 56 may include a unique value or ID (not shown) that is stored in the user's profile and that can be used to identify the user within the organization. When the user clicks on the link 56, the user's computer 14 opens a browser which locates a validation server associated with the validation system (which may be for example, the local server 38 of FIG. 1) which provides a validation page to be used to perform validation. An example, of such a validation display or page 60 is illustrated in FIG. 5. Because the user's identity can be determined from the unique ID or code within the link 56, the validation server 38 may generate the validation page 60 without requiring the user to log in, and may use the validation page 60 to ask the user to verify his or her manager and any direct reports. As illustrated in FIG. 6, the validation page 60 includes a section 62 identifying the user's manager, e-mail, office location, and other information needed or useful to clearly and unambiguously define the manager. Likewise, the validation page 60 includes a section 64 with an identification of all of the direct reports or subordinates to the user, as defined by the organizational hierarchy 50 (FIG. 3).

For each person, including the manager and the subordinates, the validation page 60 provides the user with the opportunity to indicate that that person is still in the same position and/or has transferred to a different position and/or has left the organization. In the case of the manager indicated in FIG. 5, the user may simply click a Done box 66 without more to verify the manager. However, if the manager has left the organization, the user may click a box 68 prior to clicking the Done box 66. The user may also use a Change box 70 to pull up a further page (not shown) which allows the user to specify a change in the user's manager or change in the information about the user's manager. It is preferable not to allow the user to change the manager's e-mail, as this is the e-mail address to which validation e-mails are sent to the manager, and thus, should be changed by the manager himself or herself for security purposes.

In the case of direct reports illustrated in the section 64, the user may specify, by for example clicking an appropriate check box, that the person still works for the user, has transferred to a different department or entity within the organization or has left the organization. Clicking the Done box 66 will then send these changes or verifications to the verification system for processing. In many cases, the verification system may store indicated changes but may not make the changes to user profiles 28 without an OK or acceptance by a person responsible for managing the verification system. In any case, while only one box 62 is illustrated for a manager of the user in the verification page 60, more than one manager may be verified by a user if desired, it being preferable however that each such manager of a particular user be assigned to the same validation group but to a different validation group than the user. Likewise, it is possible in many cases that a particular user may have only one or no direct reports. It is generally preferable however, and may in many instances be required, that each user validate at least one other user, whether the other user (called a closely associated user) is a manager or a direct report. While not shown as such, clicking the Done box 66 also indicates that the user is still valid. Thus, while the validation page 60 of FIG. 5 does not include a specific location for the user to validate himself or herself, simply responding to the page 60 by validating or not-validating other closely associated users also validates the user. Of course, if desired, a special or individual validation section could be provided for the user responding to the validation e-mail, if so desired.

Once the user completes the validation page 60, the validated users are marked as validated or will be determined to be valid for that validation period within the validation system. Of course, the goal is to make the validation process as simple as possible so that it does not become confusing or tedious to the users, who must complete the validation process once every two validation periods. Thus, the validation page 60 should be designed with user convenience and ease of use in mind.

In response to the feedback provided by the users who respond to the validation e-mails, the validation engine 32 updates the validation data 42 within the validation database 36 and, as noted above, uses this database 36 to determine if a user profile is valid or not within the system.

In one embodiment which enables users to verify themselves as well other users, every user record includes two sets of date fields, named VSet 1 and VSet 2. One example of such a user record 80 is illustrated in FIG. 6. In this case, each set of date fields VSet 1 and VSet 2 includes a "Sent Date" entry 82 and a "Received Date" entry 84. Here, it will be understood that the user record 80 shown in FIG. 6 belongs to a user who is within the second validation group VGrp 2. In this case, each time a validation e-mail is sent to the user (who is in VGrp 2), that date is recorded in the Sent Date for the VSet 2 field. When the user responds to the validation e-mail, that date is recorded in the Received Date field for VSet 2 field. Of course, if the user was in VGrp 1, the sent and received dates would be recorded in VSet 1 field instead.

Likewise, each time a validation e-mail is sent to a closely associated user for the user in VGrp 2 (wherein the closely associated user is in VGrp 1), that date is recorded in the Sent Date for the VSet 1 field for the user. When the closely associated user (in VGrp 1) responds to the validation e-mail by validating the user in VGrp 2, that date is recorded in the Received Date field for VSet 1 field for the user.

Figure 7:
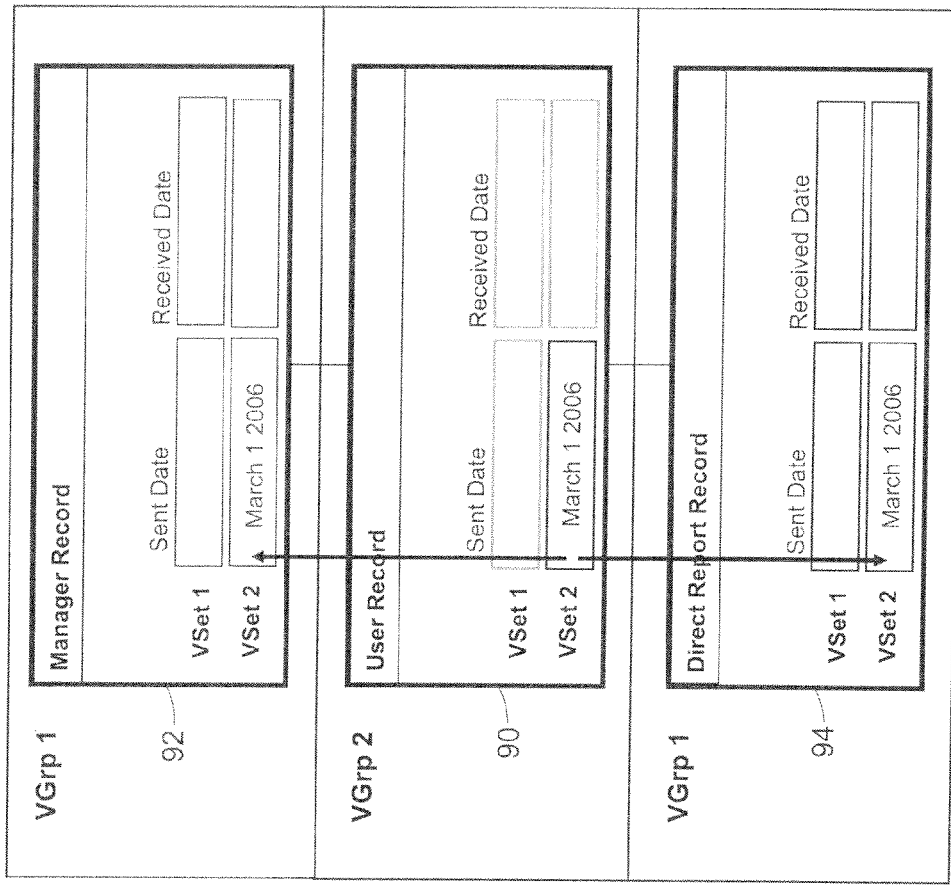
FIG. 7 illustrates an example of how three user records for closely associated users are updated in response to validation e-mails.
Figure 8:
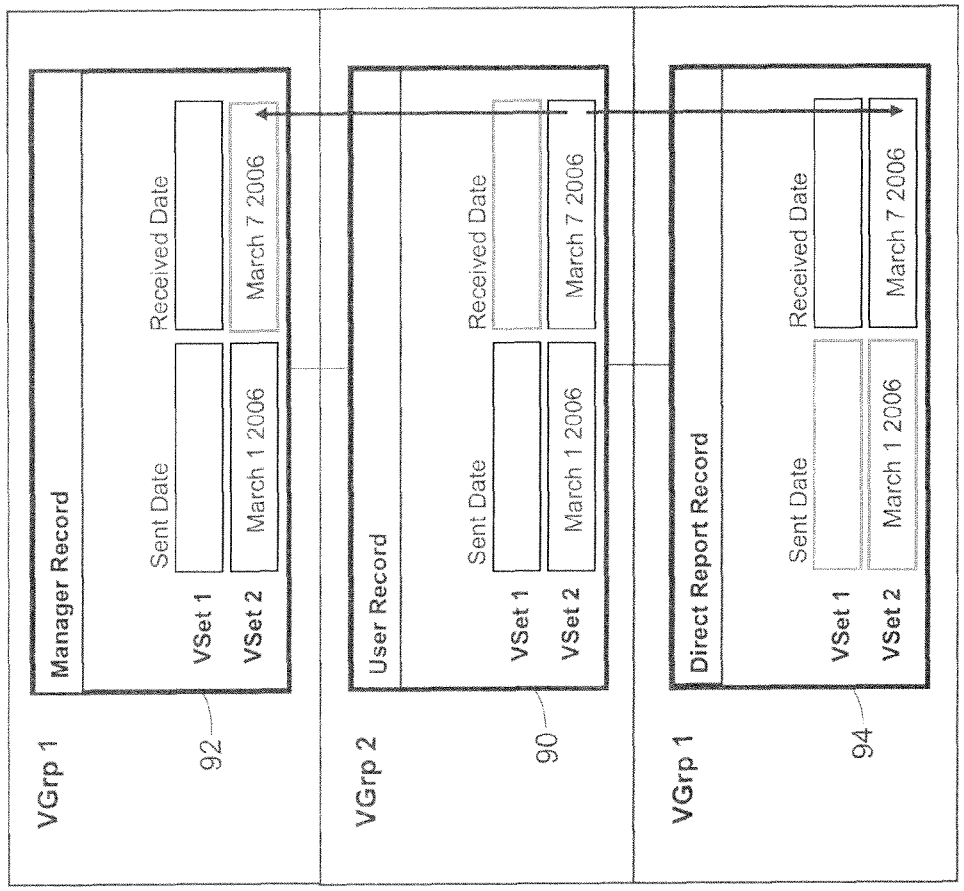
FIG. 8 illustrates a further example of how three user records for closely associated users are updated in response to validation e-mails.

In this manner, when a validation e-mail is sent to the users within any of the validation groups, the Sent Dates in the record of the user to whom the e-mail is sent, and the records of any managers and any direct reports of the user (i.e., any of the closely associated users for the user to whom the validation e-mail is sent) are set to the current date (i.e., the date on which the validation e-mail was sent). An example of this operation is illustrated in FIG. 7 for three closely associated users, including a particular user 90 (in VGrp 2), and a manager 92 of the particular user and a subordinate 94 of the particular user (both of which are in VGrp 1). In the case illustrated in FIG. 7, the sending of the validation e-mail to the user associated with the User Record 90 on Mar. 1, 2006 (who is in validation group VGrp 2) causes the Sent Date field within the VSet 2 fields for each of the Manager Record 92, the User Record 90 and the Direct Report Record to be set to the Mar. 1, 2006 date. When the user associated with the User Record 90 (who is in VGrp 2) completes the validation process for himself or herself, as well as for the manager 92 and the direct report 94, the corresponding Received Date fields for the VSet 2 fields for each of the User Record 90, the Manager Record 92 and the Direct Report Record 94 are updated with the then current date. This operation is illustrated in FIG. 8 wherein the user associated within the User Record 90 in VGrp 2 responded to the Mar. 1, 2006 validation e-mail on Mar. 7, 2006 thus validating both of the manager 92 and the direct report 94. If the user 90 did not validate one or both the manager 92 and/or the direct report 94, the Received Date for VSet 2 in the Manager Record 92 and/or the Direct Report Record 94 would not be filled in with the Mar. 7, 2006 date. Likewise, if the user associated with the User Record 90 failed to respond to the validation e-mail at all, then none of the Received Date fields in the VSet 2 records shown in FIG. 8 would be set or reset.

As will be understood, a similar type of operation occurs when the validation e-mails are sent to the users in the first validation group VGrp 1, so that the Sent Date in the VSet 1 fields for those user's records and their closely associated users' records would be set to the date that the validation e-mail was sent. Likewise, a response to the validation e-mail by the users in VGrp 1 would cause the Received Date fields within the VSet 1 records for those users and the closely associated users which those users validate to be set to the response date.

Thereafter, when a user logs in to the organizational intranet on the LAN 12 (FIG. 1) or accesses the system or portal 24 via, for example, the Internet, an Externet, etc., the validation system can easily determine the current validation status of the user by examining the Sent Dates and Received Dates for both the VSet1 and VSet2 field in the user record. Generally speaking, both of the VSet fields for a particular user record should be valid for a user to be determined to be a valid user. In one embodiment, the validation engine 34 may apply three rules to determine if the VSet data for a particular user is valid. In particular, the validation engine 34 determines (1) if the Received Date is greater (more recent) than the Sent Date. If so, then the user is valid. However, if (1) above is not true, then the validation engine 34 determines (2) if today's date falls within the VSet's validation period (e.g., the Sent Date plus two weeks). If so, the user is still determined as a valid user, as the user (or one of the closely associated users for the user) still has time to reply to the most recent validation e-mail. Moreover, the validation engine 34 (3) may determine that the user is a valid user if there are no dates in a particular VSet field, which means that the user has been recently added as a user profile. Generally speaking, if the data within the VSet fields that match the VGroup (VSet 2 for VGrp 2) for a particular user record are invalid, then the user will not receive another validation e-mail and will be denied access to the applications hosted by the portal 24. If data within the other VSet fields for the VGroup (VSet 1 for VGrp 2) is invalid, then the user will be denied access to the applications hosted by the portal 24 but will receive a validation email. If desired, however, the user may at any time, complete the validation process and thereby immediately restore access for themselves and possibly for one or more closely associated users.

The VSet Validation Period may be determined by adding the length of a validation period (as determined by the organization) to the VSet Sent Date. In this discussion the validation period is two weeks. Therefore if the Sent Date for a VSet is Jun. 2, 2006, then the Validation Period for that VSet is Jun. 2, 2006 to Jun. 16, 2006. The VSet Validation Period will remain the same until the user or a closely associated user validates the VSet and the user receives a new validation email, thereby resetting the Sent Date of the VSet. Of course, the validation period may be determined in other manners, it being understood that in all of these cases, the system determines the validity status by detecting if the received date is within a particular time period with respect to the sent date (with that particular time period being able to be defined as being from a particular date, such as the first of the month, that defines the beginning of a validation period regardless of when the validation request is sent, or from the sent date of the validation request itself).

Figure 9:
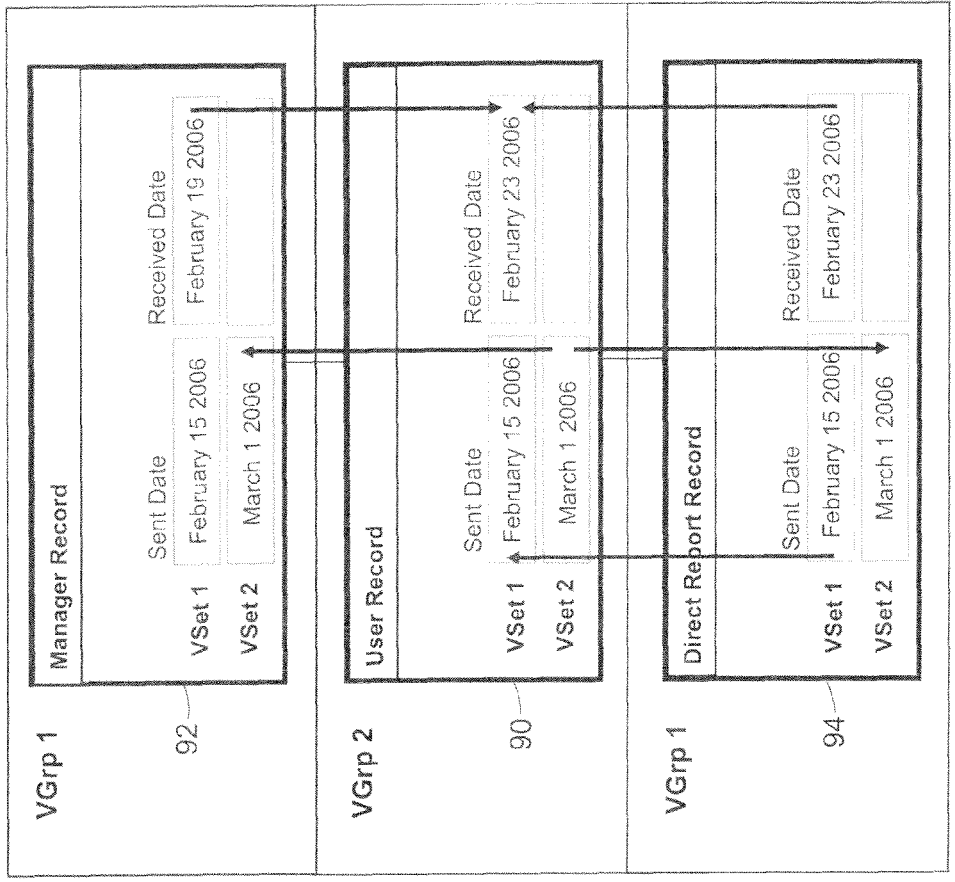
FIG. 9 illustrates three user records for closely associated users related to a first example of determining the validity or invalidity of the user profiles related to these user records.
Figure 10:
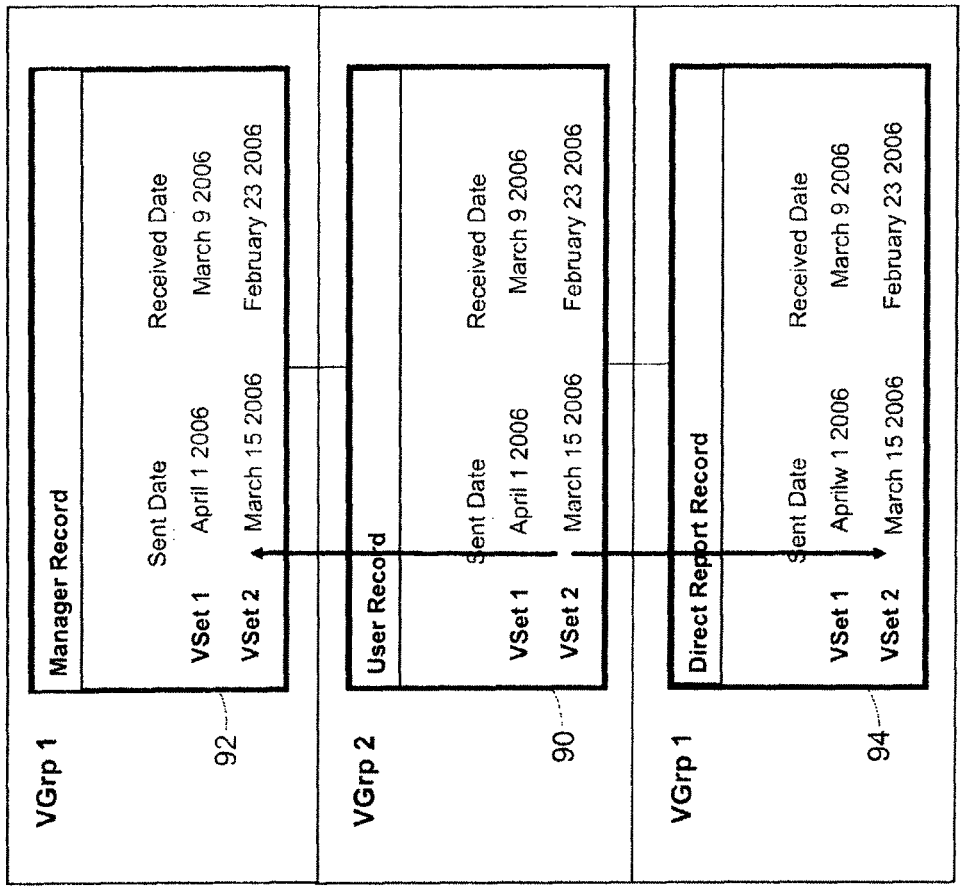
FIG. 10 illustrates three user records for closely associated users related to a second example of determining the validity or invalidity of the user profiles related to these user records.

FIGS. 9-11 illustrate three particular examples of how the validation engine 34 may use the date fields within user records 90, 92 and 94 for three closely associated users to define whether a user profile is valid based on this data. In the example of FIG. 9, the last validation period was from Feb. 15, 2006 through Feb. 28, 2006. The validation e-mail was sent to the users in VGrp 1 (i.e., to the manager for the Manager Record 92 and to the subordinate for the Direct Report Record 94) on Feb. 15, 2006. The users in VGrp 1 had until February 28 to complete the validation process. In this example, the manager 92 replied on Feb. 19, 2006 while the Direct Report replied on Feb. 23, 2006. Moreover, the received date for the user 90 (in VGrp 2) has a Received Date set to Feb. 23, 2006 for the VSet 1 field, indicating that the user's direct report 94 validated the user on February 23. However, in this case, the manager 92 also validated the user 90 on Feb. 19, 2006, but that this date was overwritten with the Feb. 23, 2006 date when the direct report validated the user 90.

Additionally, in this example, the current validation period is from March 1 through March 14. The validation e-mail for VGrp 2 is sent on Mar. 1, 2006 and the user 90 in VGrp 2 has until March 15 to complete validation in order to prevent suspension of his or her account, and potentially the manager's account 92 and any direct report accounts 94. Here, each of the users illustrated in FIG. 9 (i.e., the manager 92, the user 90 and the direct report 94) will be determined to be valid users. In particular, a user 90 remains valid only if he or she completes the validation process before the next validation period begins while the manager and direct report have done so for the last validation period, as indicated by the VSet 1 fields. Likewise, while the received dates for VSet 2 fields are not set, it is still within the current validation period, meaning that the user 90 has until March 15 to respond to the validation e-mail sent to the user 90 on Mar. 1, 2006.

FIG. 10 illustrates a database situation associated with an invalid user's account on Apr. 3, 2006. Note that the VSet 1 fields for each of the users 90, 92 and 94 are valid. However, the VSet 2 field is not valid for any of the users 90, 92 or 94 because the Received Date is earlier than the Sent Date and the current date is not within the VSet2 validation period, that is, April 3 is not between March 15 and March 29. In contrast, FIG. 11 illustrates an example showing a set of valid user accounts. Both VSets are valid even though the Received Date is before the Sent Date in VSet 2, as the Sent Date still falls within the current validation period, that is, March 1 is between March 1 and March 15. As a result, the user in VGrp 2 has until March 15 to validate before the accounts are deemed to be invalid.

It will be understood that, in some cases, a particular user may have multiple closely associated users associated therewith. In this case, it may be enough that a single closely associated user validates that user during the validation period in which the particular user does not receive a validation e-mail. Thus, a user who needs to be validated during an off validation period may need to be validated only by a single closely associated user to remain valid. However, if desired, and to provide more security, the validation engine 34 may be set up to require that each of the closely associated users for a particular user validate the particular user to keep the particular user validated, or the validation engine 34 may use a voting scheme, such as a two out of three, a three out of five, etc. voting scheme, to determine whether the responses of closely associated users is enough to keep the particular user valid.

In some situations, such as when a user leaves and the user's manager relies on that user for validation, which scenario can occur when the manager has a single direct report who leaves, the system may automatically validate the manager for the validation period of the user who leaves, when the termination or transfer is detected. Typically, a single "termination" of a manager from any closely related user (e.g., by even one direct report) will result in the manager being suspended until that manager can agree or disagree with the termination. If the manager has left the organization, the system will change his/her suspended status to terminated after a designated period of time.

While the system described herein uses a corporate e-mail address for each user, manager and direct report and thus, in one embodiment, does not rely on or use e-mail addresses within public domains, such public domain e-mail addresses may be used, provided other security safeguards are preferably put into place, such appropriate firewalls, login procedures, etc. to prevent spoofing the system.

In addition to performing initial user validation, as described above, the user validation system can be used to control and update user profiles to provide various sublevels of access to one or more of the applications 18 and 18A based on information within the user profile. In particular, without consistent review of profile changes and performing the necessary updating of a user's security setting within the security application, the proper level of security is effective generally only upon initial setup of a user profile within the system. There are many events, however, that can occur within an organization which should result in changes to the user profile and thereby result in possible changes regarding access to particular applications available via the organizational resources. For example, access to sensitive sales information may be open to all direct employees but restricted to employees of an affiliate company associated with the organization. However, if an employee transfers to the affiliate, then the employee status should change to prevent the access to sales information, while maintaining access to other applications or features of particular applications. As another example, access to account strategy may be open to all sales people working on the account but restricted from all other sales people. If a sales person changes roles in the organization and is no longer working on a particular account, then that person should not have access to the account information. As a still further example, access to product training may be available to certain divisions but restricted to those divisions with third party representatives with competing lines of products. However, if an employee changes divisions, this employee should be prevented from accessing the product training application.

Generally speaking, in the past, all of these and the many more possible changes within the organization would preferably trigger a review by an application administrator who would decide whether or not to modify the security setting for the user experiencing the change in position. Unfortunately however, in many instances, such a review does not occur at all or does not occur in a timely manner. The primary reason that profile changes go unattended is that application owners are dependent on one or many departments within the organization, such as the HR department, to notify them of a change to a user's profile. Many times this notification does not occur or does not occur very quickly, and still other times the department tasked with this responsibility may be located in an affiliate's office located in, for example, a third world country, which may make the operations somewhat unreliable. Thus, in many situations, for various reasons, the use of one or more departments to manually update user profiles and notify application owners as a result of changes in the organization is unreliable.

To overcome or reduce this problem, a user may update his/her profile via the link in the validation e-mail or at any other time using the profile management system located on the portal 24. Additionally, a user may indicate the transfer of a closely related user. This updating process includes but is not limited to the termination of a manager or a direct report. In this event, the terminated user may be immediately suspended from access to the portal 24 and to the applications hosted within or through the portal 24. However, if desired, the validation system can be configured to alert and/or update an external application only when specific fields in a user profile are changed, rather than sending a notice when any field changes. These specific fields may be chosen as the ones for which changes should be reviewed by an application administrator who can update, if necessary, the security setting for the particular user based on the changes.

Thus, the validation system described herein can also be used to update user profile information to enable or allow the proper access by various users to various applications as changes within the organization occur. In particular, as discussed above with respect to FIG. 1, the user validation system maintains information about each user, e.g. name, company, division, email address, title, manager, etc. as part of the user profile, and the validation page 60 of FIG. 5 may enable each user to change or update this information for himself or herself and possibly for other closely associated users. In some cases, however, changes to user profiles may be submitted to a manager or other persons for review before being implemented to assure that a user does not grant himself or herself more access than that person should have, or to prevent the inadvertent or even possibly intentional locking other users out of the system by, for example, disgruntled employees.

While user profile information is described herein as being stored locally by the portal 24, this information may instead or in addition be distributed to the applications 18A hosted within the portal 24 in real-time through various communication schemes, including direct database communication, XML, and URL based communications, etc. Then, the external applications 18A and 18 are able to take whatever action is deemed appropriate for the event. In these cases, it will be understood that the portal 24 only determines if a user should be allowed to communicate to an external application 18A or 18 and that it may be up to the application 18A or 18 to determine what level of access the user has or what content the user is allowed to see based on the user profile or other information stored within the application 18A or 18.

Moreover, because the user validation and profile management system described herein tracks manager and direct report information for each user, the system is able to construct an accurate organizational tree at any time, based on the user profiles and the defined VGrps. An example of such an organizational tree 100 is illustrated in FIG. 12. Changes in reporting structure can be made during the validation process or at any time via for example an "Organization Information" entry on the home page for the portal 24. However, the system may institute a waiting period prior to making organizational changes, to prevent possible collusion between disgruntled or unscrupulous employees who may try to trick the validation system by creating false links between themselves and another user. For example, before allowing a change in the organization information to be implemented, the system may require the user and the user's old manager to agree to the proposed reorganization. Any of the users involved may disagree with the change. Finally, in this example, a portal administrator may review the request and give final approval or disapproval of the change. In any event, the system may automatically recalculate the organizational tree 100 when a user transfers from one manager to another or makes some other change in the organization. Because all of the people involved in the transfer have the option to terminate the user or manager during the process, this type of event implies validation. Therefore, the system may validate both the user being transferred and the user's manager during this process if so desired.

While the validation process described above uses two validation groups and two sets of validation dates, VSet 1 and VSet 2, each with a "Send" and "Receive" date for each user validation record, the system may be designed to have more validation groups and date sets. As one example, three validation groups and date sets may be used, as described below, in which it will be understood that the validation period is two weeks.

As discussed above, the validation system depends on properly assigning each user to the correct validation group, which is used to determine when a user should receive a validation e-mail. In this example, users will be assigned to one of three validation groups, VGrp 1, VGrp 2, or VGrp 3. The validation groups are calculated by building a hierarchical tree based on the user/manager relationships collected initially during registration and thereafter either by the validation process itself or through profile updates made by the user. Once the organizational tree is built, the VGrps may be determined by applying the following logic:

(1) A user who is not a manager (has no direct reports) is assigned to VGrp 1;
(2) A user who is a manager (has at least one direct report) is assigned to VGrp 2; and
(3) The VGrp 2 managers are examined starting at the bottom of the tree, and if a VGrp 2 manager does not have at least one direct report who is in VGrp 1, then the manager is assigned to VGrp 3. As the system moves up the tree to the next level, the system alters the check on the VGrp 2 manager such that if a VGrp 2 manager does not have at least one direct report that is in either VGrp 1 or VGrp 3, then the manager is assigned to VGrp 3.

Figure 13:
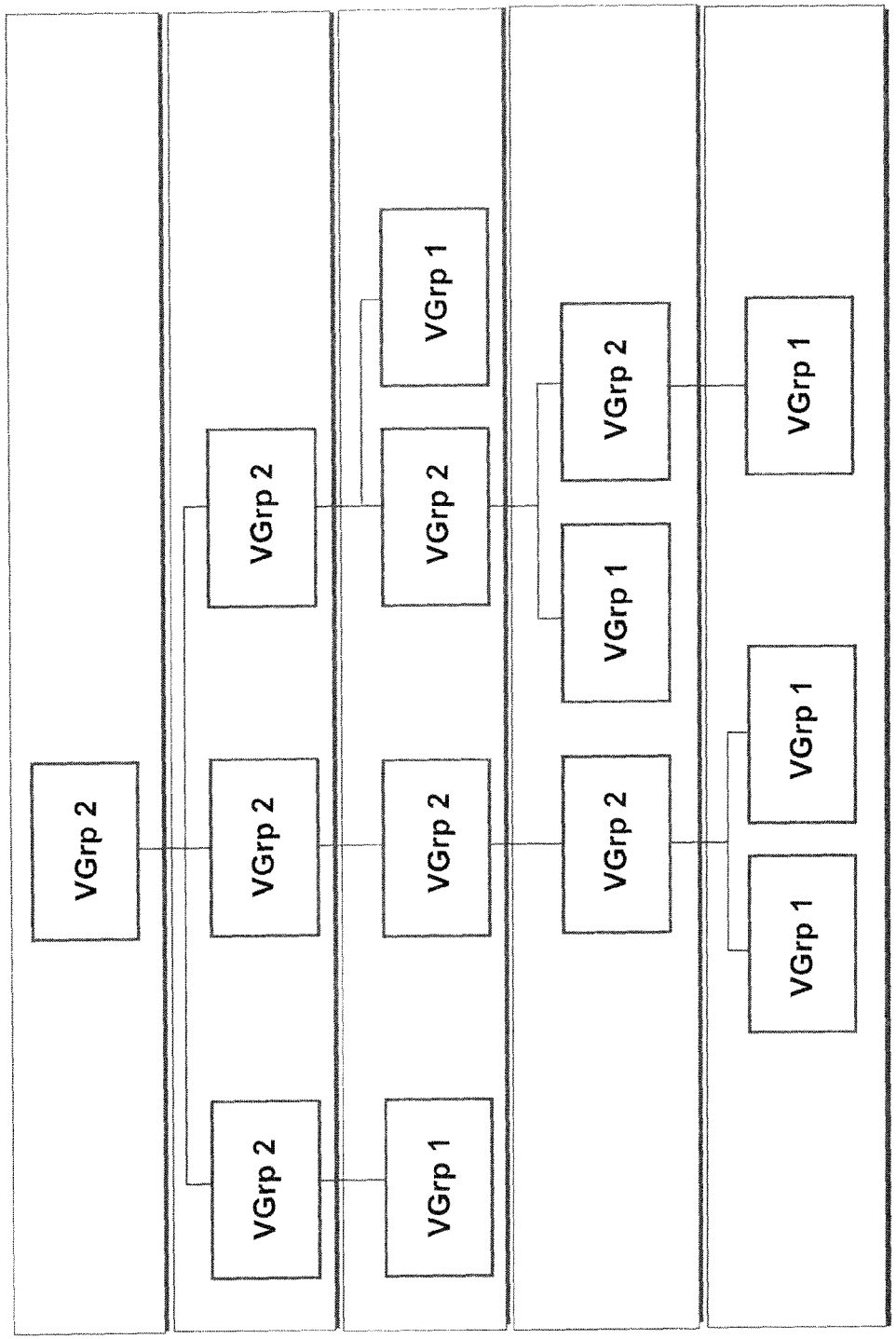
FIG. 13 is a depiction of an organization chart or hierarchy initially used to define three validation groups for the user validation and profile management system of FIGS. 1 and 2.
Figure 14:
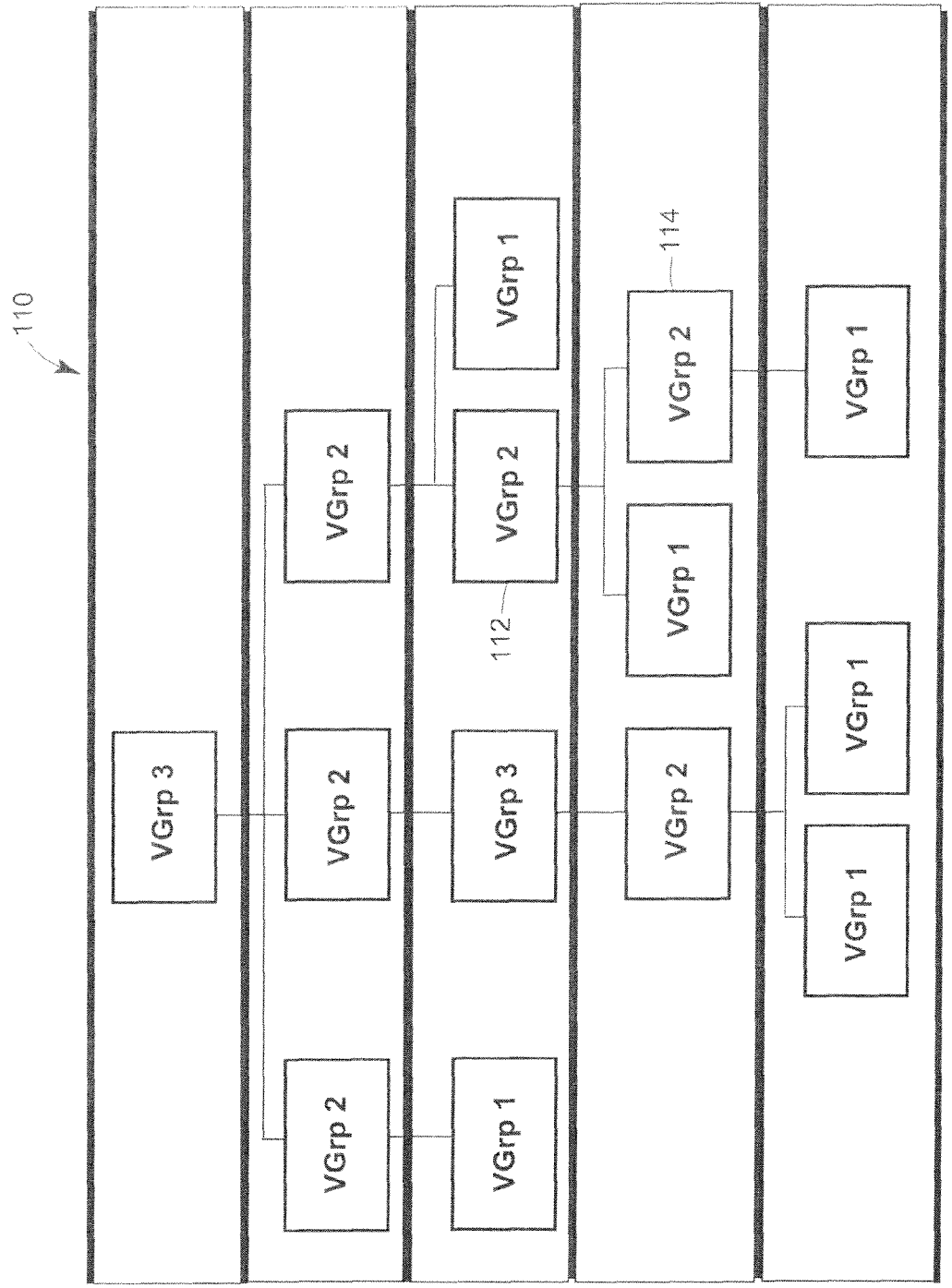
FIG. 14 is a depiction of an organization chart or hierarchy defining three validation groups for the user validation and profile management system of FIGS. 1 and 2.

FIG. 13 illustrates an organizational hierarchy 110 which is completed after implementing the first two steps above, in which an initial set of VGrp 1 and VGrp 2 users are established. FIG. 14 illustrates the same organizational hierarchy 110 after application of the third step above to redefine certain ones of the VGrp 2 managers as VGrp 3 managers. The reason for step three above is to assure that, for every user, there is at least one other user connected directly to the user on the tree 110 in a different validation group. Effectively, every manager in the tree 110 must have at least one direct report who is assigned to a validation group that has an opposite e-mail timing than their own. In this manner, two users connected on the organizational tree 110 and responsible for validating one another will never receive a validation e-mail at the same time (during the same validation period) and additionally any particular user will never receive an e-mail more than once in a four week period (or once for every two validation periods). In the case where users connected directly to one another on the tree 110 are still within the same validation group, such as the users 112 and 114 of FIG. 14, these users will not need to validate one another, as there are other users in different validation groups (VGrp 1 or VGrp 3) who are directly connected to the users 112 and 114 and who can provide the validation function.

In a slightly different manner than the case described above for two validation groups, a validation e-mail is sent to the users in the validation groups VGrp 1 and VGrp 3 or to the users in validation group VGrp 2 every validation period, with the target groups alternating every validation period. Here, the validation e-mails are sent to the users in validation groups VGrp 1 and VGrp 3 at the same time, which may therefore be logically considered as one group for this purpose. This feature is used to assure that two users connected on the tree never receive a validation e-mail during the same validation period. For example, if the validation e-mails for VGrp 1 and VGrp 3 are sent on January 2, then the validation e-mails for VGrp 2 will sent on January 16, and the validation e-mails for VGrp 1 and VGrp 3 will be sent again on January 30, etc.

Here, the validation system requires each user who has been assigned to VGrp 1 (direct reports) to validate the user directly connected above this user in the organizational tree 110. Users assigned to VGrp 2 (managers) are required to validate the users connected directly above and below them in the organizational tree 110. Thus, when a user completes validation, he/she has effectively validated themselves, and possibly their manager, and any direct reports for the current validation period. Again, as with the case with two validation groups, any particular user will never receive a validation e-mail more than once every two validation periods. Moreover, because the users in one validation group validate the users in the validation groups directly above and/or below them on the organizational tree 110, each user is validated twice in every four week period (2 validation periods) while receiving only one validation e-mail.

Figure 15:
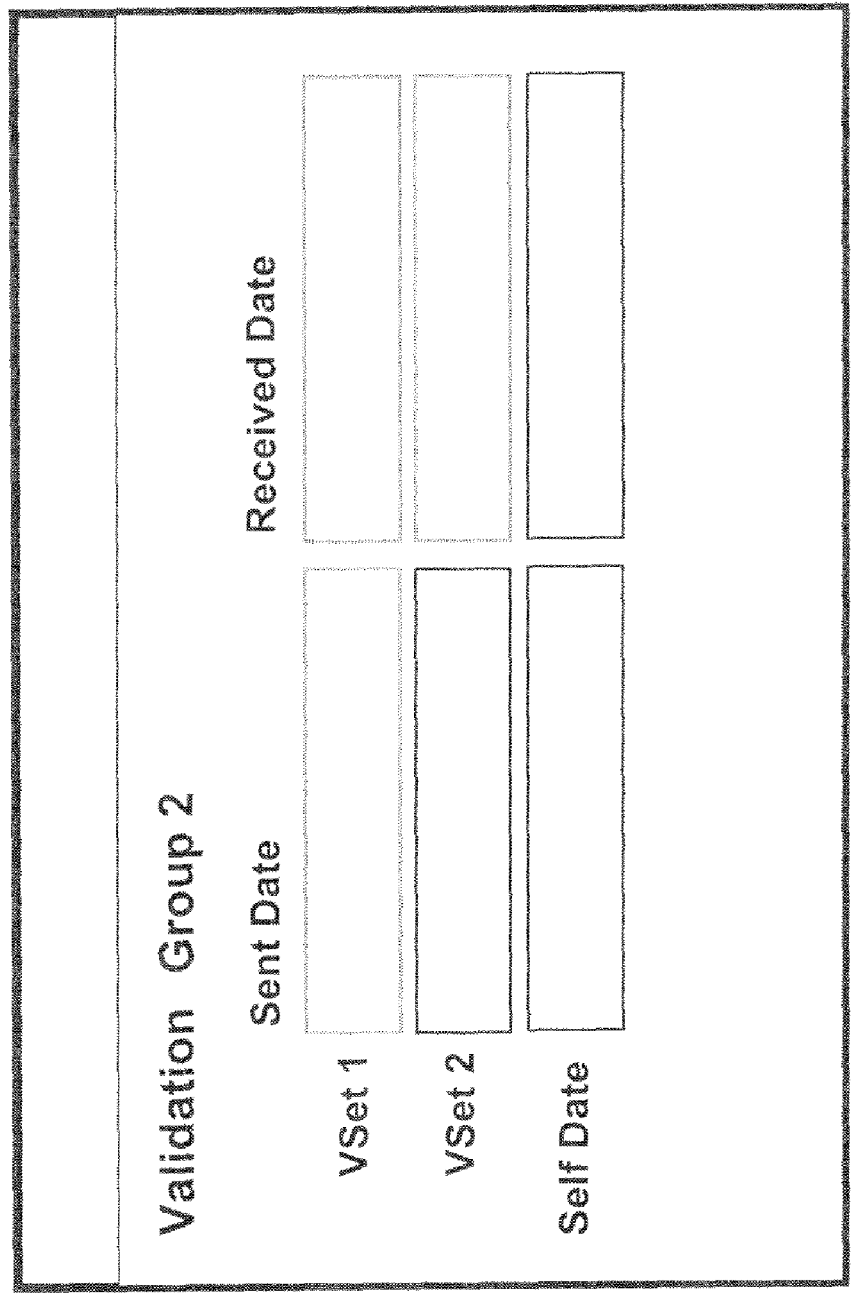
FIG. 15 illustrates a user record having three sets of validation fields for determining the validity of a related user profile.
Figure 16:
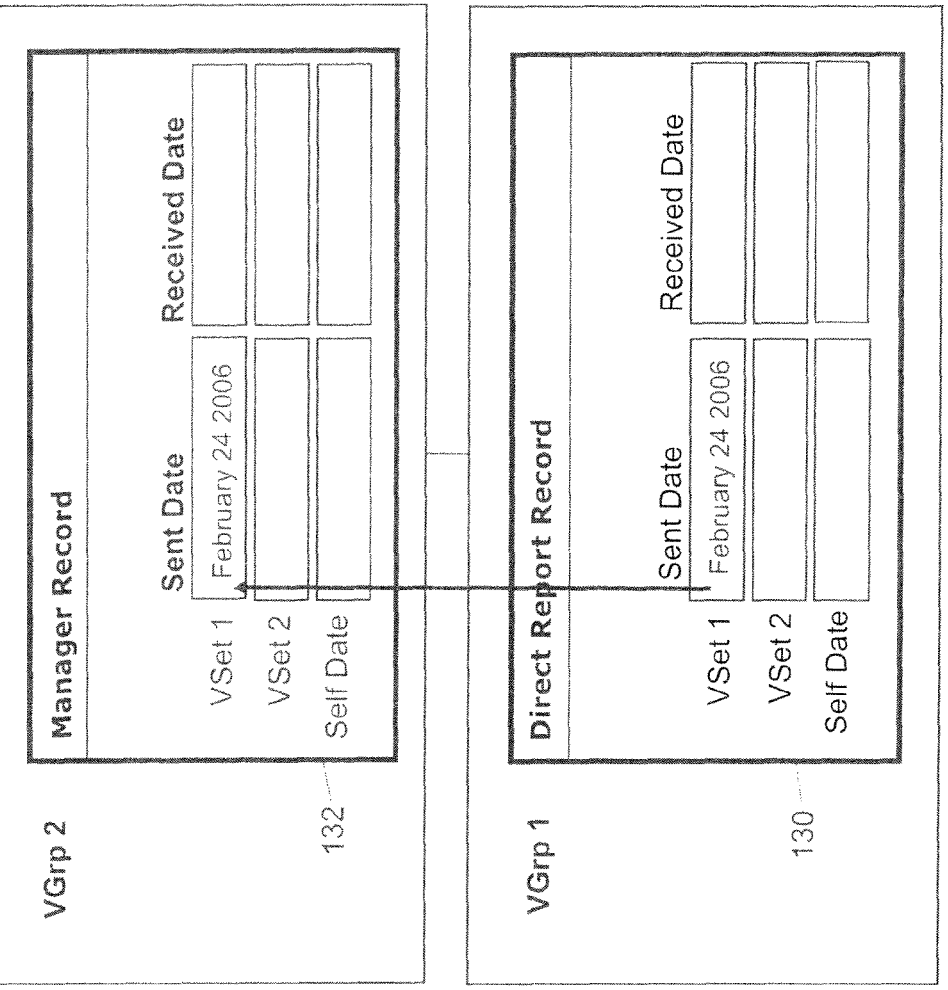
FIG. 16 illustrates a first example of how user records of the type of FIG. 15 for closely associated users are updated in response to validation e-mails.

As illustrated in FIG. 15 for this example, every user record 120 has three sets of validation date fields 122, called VSet 1, VSet 2, and Self Date. Each set of validation fields 122 contains a "Sent Date" and a "Received Date" as illustrated in FIG. 15. As will be understood, VSets are linked between users who are directly connected to one another in the organizational tree 110 (i.e., closely associated users). When a date is assigned to a VSet in one user record, the linked dates in the connected user record(s) are assigned the same date. For example, each time a validation e-mail is sent to a member of VGrp 1, the Sent Dates are set to the current date in the VSet 1 date fields in both the user's record, and the user's manager's record. The Self Date field is not used for VGrp 1 users. An example of this operation is illustrated in FIG. 16 for a Direct Report Record 130 (in VGrp 1) and a Manager Record 132 (in VGrp 2).

Figure 17:
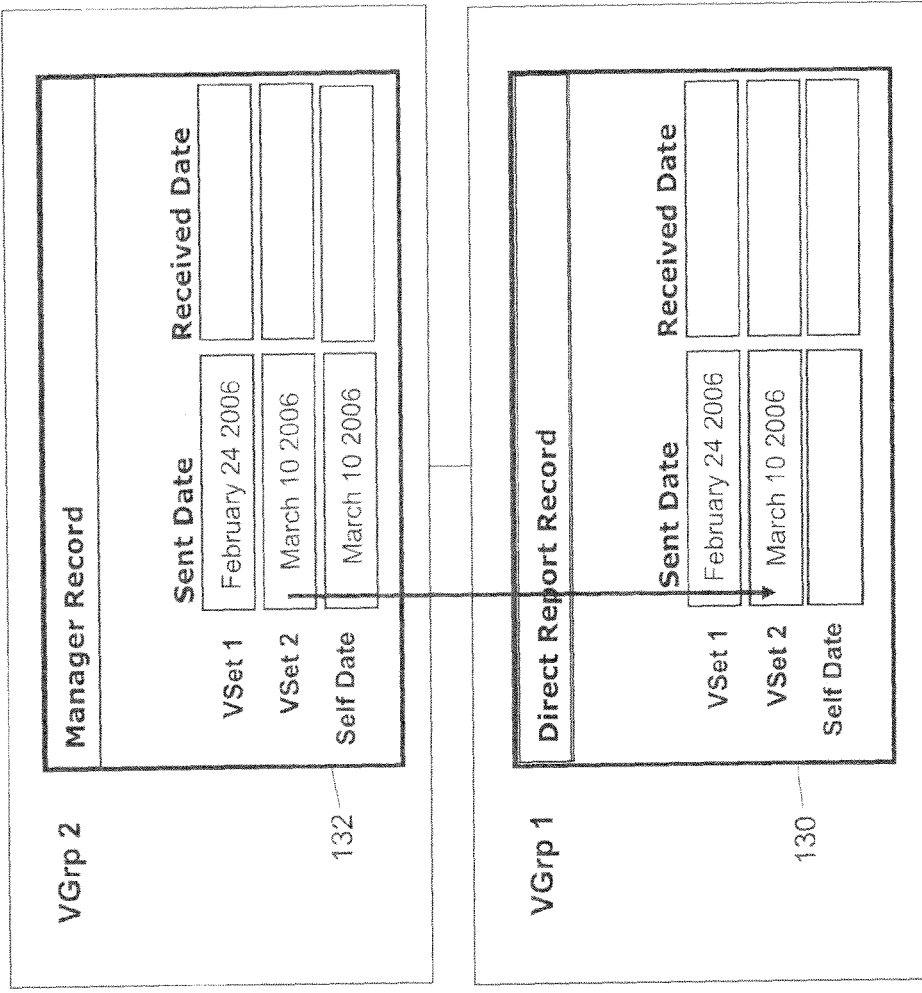
FIG. 17 illustrates a second example of how user records the type of FIG. 15 for closely associated users are updated in response to validation e-mails.

Moreover, each time a validation e-mail is sent to a member of VGrp 2 or VGrp 3, the Sent Dates are set to the current date in the VSet 2 pair of dates in the user's record, the user's direct report's record, and the user's manager's record. An example of this operation is illustrated in FIG. 17 for the same user records 130 and 132 of FIG. 16. Additionally, for VGrp 2 and VGrp 3, the Sent Date of the Self Date pair of dates is set to the current date in the user's record as illustrated in FIG. 17 for the Manager Record 132. When a user completes the validation process, the corresponding Received Dates for the linked users are updated with the then current date.

In this example, assigning dates to VSets can be summarized by the following rules:

(1) VGrp 1 and VGrp 3 are always sent the validation e-mail on the same date.
(2) VSet 1 Sent Date is set with the current date when users in VGrp 1 receive a validation e-mail (VSet 1 Sent Dates are linked between closely related users).
(3) VSet 2 Sent Date is set with the current date when users in either VGrp 2 or VGrp 3 receive a validation e-mail. VSets 2 and 3 can be thought of as "manager" groups, with the users in these groups always having at least one direct report (VSet 2 Sent Dates are linked between closely related users.)
(4) The Sent Self Date is set with the current date when users in VGrp 2 or VGrp 3 receive a validation e-mail. The Sent Self Date is not linked to Sent Self Date in any other VGrp and is set only for the user receiving the validation e-mail.
(5) Self Dates are never set for users in VGrp 1.
(6) Linked VSet 1 Received Dates are set for VGrp 1 and VGrp 2 when a user in VGrp 1 validates.
(7) Linked VSet 2 Received Dates in VGrp 1, VGrp 2, and VGrp 3 are set when a user in VGrp 2 validates.
(8) Linked VSet 2 Received Dates in VGrp 3 and VGrp 2 are set when a user in VGrp 3 validates.
(9) If a user did not complete validation, he/she will not receive a new validation e-mail until they do so.
(10) Linked VSet Dates will always be updated even for a user that is invalid.
(11) The Received Self Date is set when a user in VGrp 2 or VGrp 3 validates. Self Dates are not linked between VGrps.

Using this setup, when a user logs in, the validation system can easily determine the current validation status of the user by examining the Sent Dates and Received Dates for VSet1, VSet2, and Self Date fields in the user record. All date groups must be valid for a user to be valid. Here, if any of the three rules below is true, than the validation engine 34 may determine that a VSet field is valid:

(1) If the Received Date is greater (more recent) than the Sent Date;
(2) If (1) above is not true, but today's date falls within the VSet's validation period (e.g., the Sent Date plus 2 weeks); or
(3) If there is no date within both of the Sent Date field and the Received Date field.

If the data within the VSet fields that match the VGroup (VSet 2 for VGrp 2) for a particular user record are invalid, then the user will not receive another validation e-mail and will be denied access to the applications hosted by the portal 24. If data within the other VSet fields for the VGroup (Vset 1 for VGrp 2) is invalid, then the user will be denied access to the applications hosted by the portal 24 but will receive a validation email.

Figure 18:
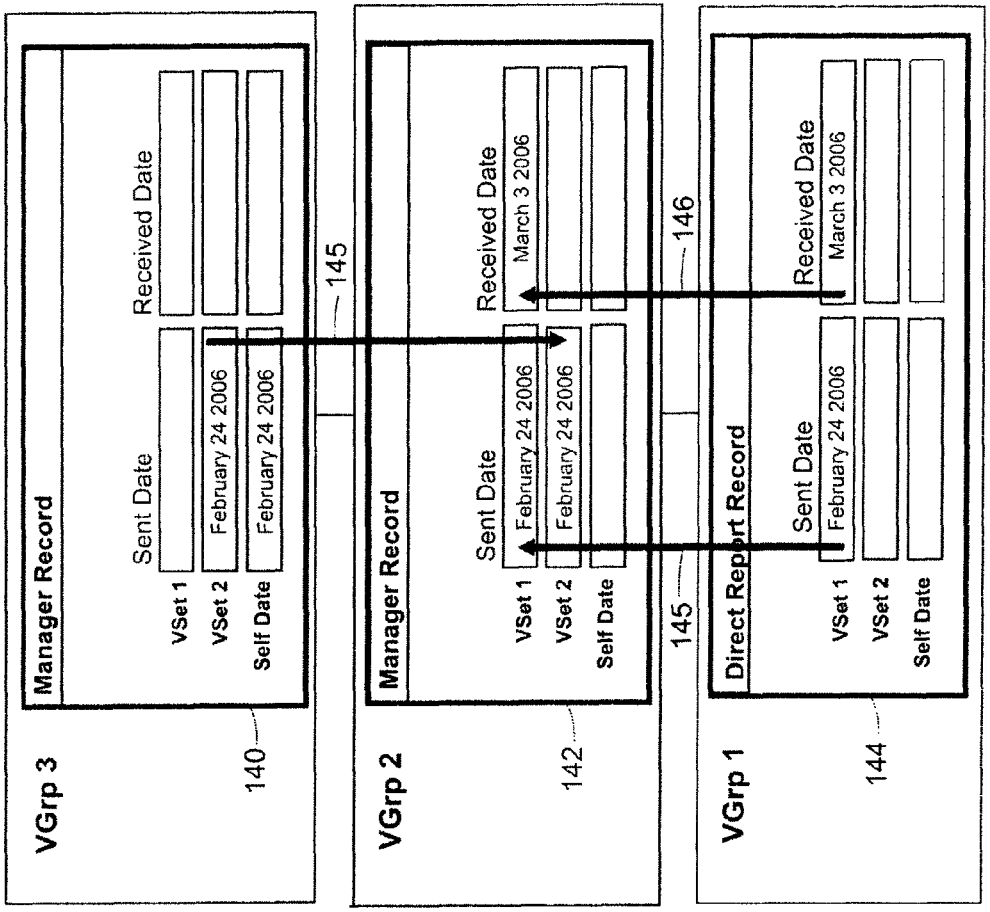
FIG. 18 illustrates three user records for closely associated users having three validation fields and related to an example of determining the validity or invalidity of user profiles associated with these user records at a first time.

As an example, FIG. 18 shows user records for a Manager Record (VGrp 3) 140, a Manager Record (VGrp 2) 142 and a Direct Report Record (VGrp 1) 144 as they would appear during the first validation cycle. The validation period begins Feb. 24, 2006. Validation e-mails are sent on that date to VGrp 1 and VGrp 3. The arrows 145 in FIG. 18 indicate the link between Sent Dates for VSet 1 in VGrp 1 and VGrp 2 and the link between the Sent Dates for VSet 2 in VGrp 3 and VGrp 2. The Sent Self Date for the user in VGrp 3 is also set to February 24. Moreover, as illustrated in FIG. 18, the user 144 validated himself or herself on Mar. 3, 2006 and additionally validated the closely associated user 142. The arrow 146 shows this validation for the VSet 1 fields in the records 144 and 142.

Figure 19:
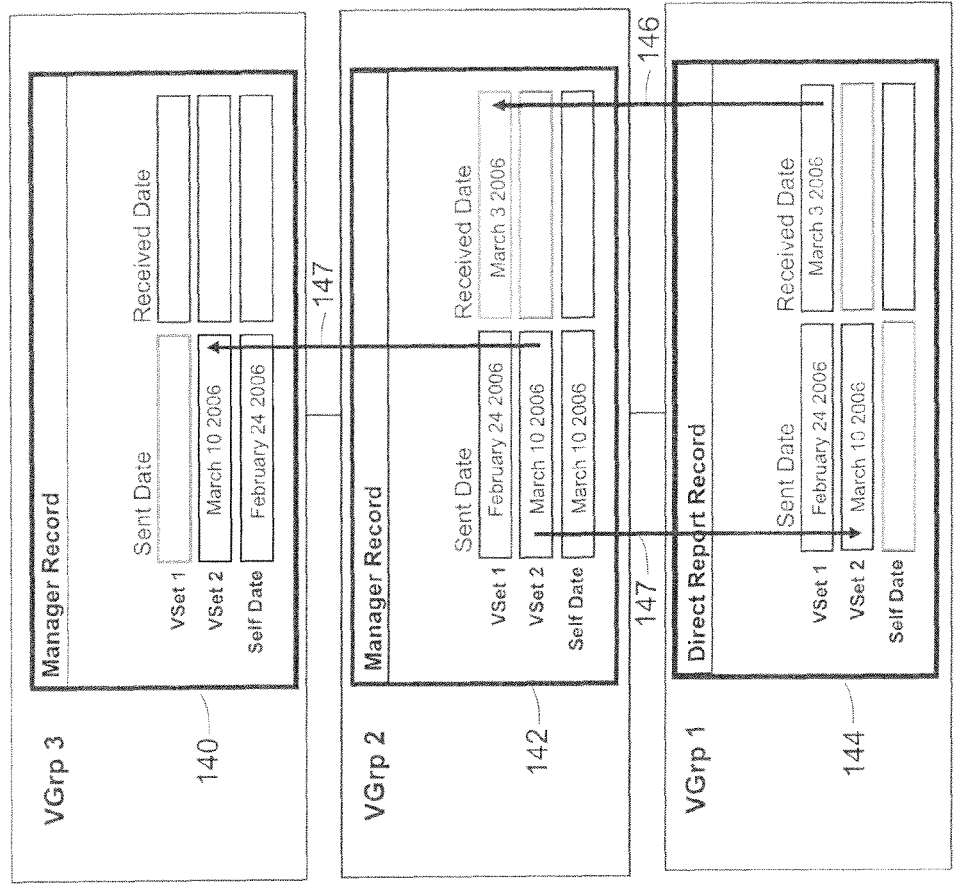
FIG. 19 illustrates three user records for closely associated users having three validation fields and related to an example of determining the validity or invalidity of user profiles associated with these user records at a second time.

If the validation period is two weeks, then the next set of validation e-mails is sent to VGrp 2 on Mar. 10, 2006. FIG. 19 shows the user records as they would appear when the validation e-mails are sent on that day, assuming the user in VGrp 1 validated on Mar. 3, 2006. The linked Received Dates (indicated by the arrow 146) for VSet 1 in VGrp 1 and VGrp 2 reflect the validation by the user 144 of the manager 142. In the same manner as shown in FIG. 18, the Sent Dates for VSet 2 in the VGrp 2 record 142 are linked to Sent Dates for VSet 2 in VGrp 1 below and VGrp 3 above, as shown by the arrows 147. Now, the validation status for the users 140, 142 and 144 in the validation period of March 10 to March 24 (i.e., before Mar. 24, 2006) can be summarized as follows:
 (1) The user in VGrp 3=Invalid as Self Received Date is blank and Self Sent Date is not within the current validation period, March 10 to March 24;
 (2) The user in VGrp 2=Valid as all VSets for the record 142 are valid according to the three validation rules; and
 (3) The user in VGrp 1=Valid as all VSets for the record 144 are valid according to the three validation rules.

Figure 20:
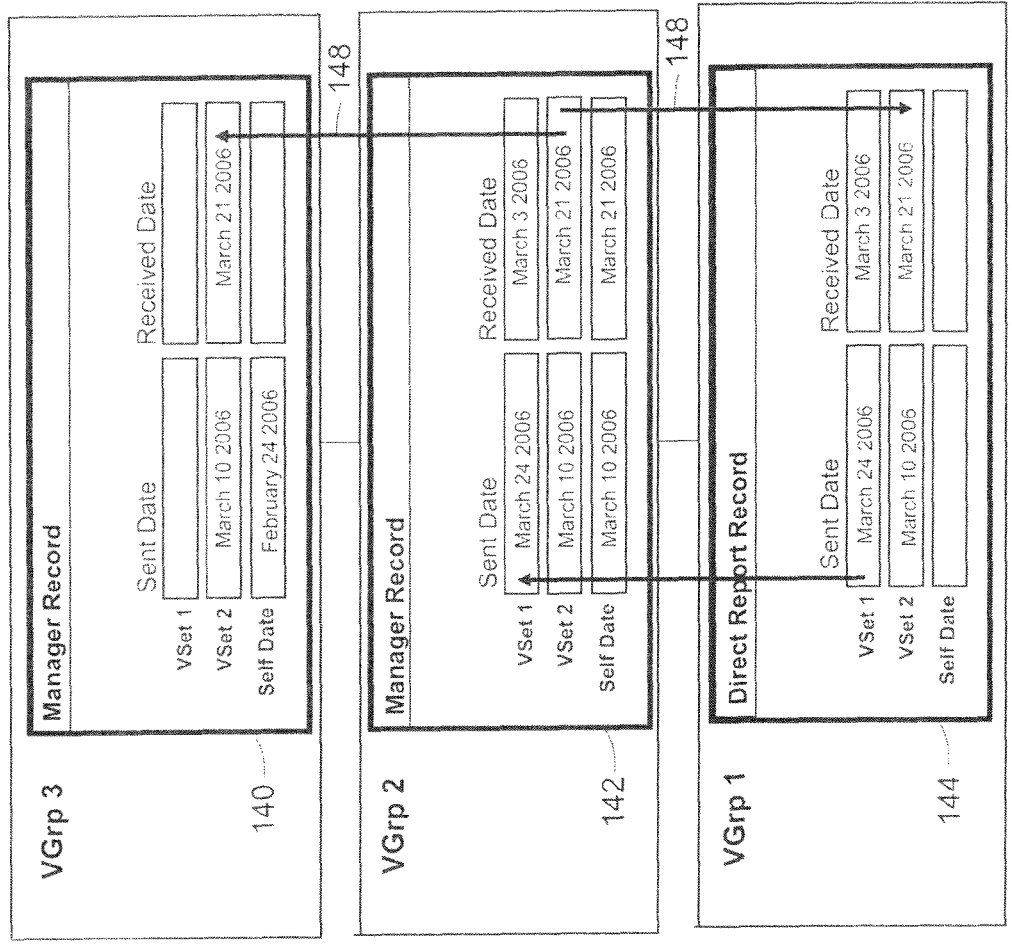
FIG. 20 illustrates three user records for closely associated users having three validation fields and related to an example of determining the validity or invalidity of user profiles associated with these user records at a third time.

Now, in this example, the next set of validation e-mails will be sent on Mar. 24, 2006 to VGrp 1 and VGrp 3 as illustrated in FIG. 20. Assume that the user 142 in VGrp 2 validated himself or herself and both the manager 140 and the direct report 144 on Mar. 21, 2006, which is shown by the arrows 148 in FIG. 20 as well as by the Received Date in the Self Date field of the user record 142. As can be seen, the Received Dates for the VSet 2 fields in VGrp 1, 2, and 3 are all linked and were updated with the Mar. 21, 2006 date. Also, the Received Self Date was set to Mar. 21, 2006 for the user 142 in VGrp 2. It is important to note that the user 140 in VGrp 3 did not receive a validation e-mail for this period. The reason is that the user's account is now invalid because he/she has not validated for the period beginning Feb. 24, 2006 through Mar. 10, 2006 as indicated by the blank field within the Received Date field of the Self Date of the record 140. Therefore, the Sent Dates for VSet 2 in VGrp 3 and VGrp 2 remain at Mar. 10, 2006. The Received Self Date is not greater than the Sent Self Date and "today," March 26, is outside the validation period from February 24 to March 10. Now the users' validation status' on Mar. 26, 2006 can be summarized as:
 (1) The user in VGrp 3=Invalid as the Received Self Date<Sent Self Date and Today (March 26) is outside the validation period beginning with the Self Sent Date (February 24 to March 10);
 (2) The user in VGrp 2=Valid as all VSets are valid according to the three validation rules: and
 (3) The user in VGrp 1=Valid as all VSets are valid according to the three validation rules.

Following this example, as shown in FIG. 21, the next set of validation e-mails will be sent on April 7 to the user 142 in VGrp 2. Here, it is shown by the arrow 149 that the user in VGrp 1 validated the user 142 on April 4. Even though VGrp 3 is not valid, the VSet 2 Sent Date in VGrp 3 is updated because it is linked to the VSet 2 Send Date in VGrp 2. Self Date remains at Feb. 24, 2006. Now, the user status for each of the users 140, 142 and 144 on Apr. 11, 2006 can be summarized as follows:
 (1) The user in VGrp 3=INVALID as
  VSet 2: Received Date>Sent Date;
  Self Date: Received Self Date<Sent Self Date, and today (April 11) is outside the validation period beginning with Self Sent Date (February 24-March 10);
 (2) The user in VGrp 2=VALID as
  VSet 1: Received Date>Sent Date;
  VSet 2: Received Date<Sent Date, but today (April 11) is within the VSet's Validation Period (April 7-April 21); and
  Self Date: Received Date>Sent Date;
 (3) The user in VGrp 1=VALID as
  VSet 1: Received Date>Sent Date; and
  VSet 2: Received Date<Sent Date, but today (April 11) is within the VSet's Validation Period (April 7-April 21).

Of course, as described above, a user remains valid only if he or she completes the validation process before the next validation period begins. Failure to do so results in the user's account and possibly their manager's, and/or their direct report's accounts becoming invalid, meaning they no longer have access to the portal 24 or to the applications 18A within it or the applications 18 administered by it. The invalid user may at any time, complete the validation process and thereby immediately restore access for themselves, the manager, and all direct reports.

Although the forgoing text sets forth a detailed description of numerous different embodiments of the invention, it should be understood that the scope of the invention is defined by the words of the claims set forth at the end of this patent. The detailed description is to be construed as exemplary only and does not describe every possible embodiment of the invention because describing every possible embodiment would be impractical, if not impossible. Numerous alternative embodiments could be implemented, using either current technology or technology developed after the filing date of this patent, which would still fall within the scope of the claims defining the invention.

Thus, many modifications and variations may be made in the techniques and structures described and illustrated herein without departing from the spirit and scope of the present invention. Accordingly, it should be understood that the methods and apparatus described herein are illustrative only and are not limiting upon the scope of the invention.

What is claimed is:

1. A method of electronically determining a status of multiple users within a computer network, the method comprising:
 storing a status indication for each of a first user and a second user having access to the computer network, the status indication for each particular one of the first user and the second user including profile information for the particular user indicating access rights that the particular user has to one or more applications available via the computer network;
 assigning the first user to a first user set and assigning the second user to a second user set;

automatically and periodically sending a first electronic validation request to the first user within the first user set requiring the first user to respond to the first electronic validation request to validate the status of the second user;

determining the validity of the status indication of the second user based on the receipt of a response from the first user to the first electronic validation request;

automatically and periodically sending a second electronic validation request to the second user within the second user set requiring the second user to respond to the second electronic validation request to validate the status of the first user;

determining the validity of the status indication of the first user based on the receipt of a response from the second user to the second electronic validation request;

determining whether to provide the first user access to the one or more applications available via the computer network based on determining the validity of the status indication of the first user; and determining whether to provide the second user access to the one or more applications available via the computer network based on determining the validity of the status indication of the second user.

2. The method of electronically determining a status of multiple users of claim 1, wherein determining the validity of the status indication of the second user based on the receipt of a response from the first user to the first electronic validation request includes determining whether the response from the first user to the first electronic validation request is sent within a predetermined period associated with the first electronic validation request.

3. The method of electronically determining a status of multiple users of claim 2, wherein determining the validity of the status indication of the first user based on the receipt of a response from the second user to the second electronic validation request includes determining whether the response from the second user to the second electronic validation request is sent within a second predetermined period associated with the second electronic validation request.

4. The method of electronically determining a status of multiple users of claim 1, wherein sending a first electronic validation request to the first user includes sending the status indication of the second user as part of the first electronic validation request and wherein determining the validity of the status indication of the second user based on the receipt of a response from the first user to the first electronic validation request includes determining whether the first user agrees with the status indication of the second user sent within the first electronic validation request within the response from the first user to the first electronic validation request.

5. The method of electronically determining a status of multiple users of claim 4, wherein sending the second electronic validation request to the second user includes sending the status indication of the first user as part of the second electronic validation request and wherein determining the validity of the status indication of the first user based on the receipt of a response from the second user to the second electronic validation request includes determining whether the second user agrees with the status indication of the first user sent within the second electronic validation request within the response from the second user to the second electronic validation request.

6. The method of electronically determining a status of multiple users of claim 1, further including determining the validity of the status indication of the first user based on the receipt of a response from the first user to the first electronic validation request.

7. The method of electronically determining a status of multiple users of claim 6, further including determining the validity of the status indication of the second user based on the receipt of a response from the second user to the second electronic validation request.

8. The method of electronically determining a status of multiple users of claim 1, including creating a first storage field for the first user and a second storage field for the second user, storing indications of the responses to the first and second electronic validation requests in the first and second storage fields, and determining the validity of the status indication of the first user at any particular time based on information stored in the first storage field and determining the validity of the status indication of the second user at any particular time based on information stored in the second storage field.

9. The method of electronically determining a status of multiple users of claim 8, wherein determining the validity of the status indication of the first user at any particular time based on information stored in the first storage field includes determining if the response to the second electronic validation request was received within a particular time period with respect to when the second electronic validation request was sent.

10. The method of electronically determining a status of multiple users of claim 8, wherein determining the validity of the status indication of the first user at any particular time based on information stored in the first storage field includes determining if the response to the first electronic validation request was received within a particular time period with respect to when the first electronic validation request was sent.

11. The method of electronically determining a status of multiple users of claim 8, wherein determining the validity of the status indication of the first user at any particular time based on information stored in the first storage field includes determining if the response to the first electronic validation request was received within a particular amount of time with respect to when the first electronic validation request was sent and determining if the response to the second electronic validation request was received within a particular time period with respect to when the second electronic validation request was sent.

12. The method of electronically determining a status of multiple users of claim 1, further including:

storing a status indication for a third user having access to the computer network, the status indication for the third user including profile information for the third user indicating access rights that the third user has to the one or more applications available via the computer network;

assigning the third user to a third user set;

automatically and periodically sending an electronic validation request to the second user within the second user set requiring the second user to respond to the electronic validation request to validate the status of the third user;

determining the validity of the status indication of the third user based on the receipt of a response from the second user to the electronic validation request to validate the status of the third user;

determining whether to provide the third user access to the one or more applications available via the computer network based on determining the validity of the status indication of the third user;

automatically and periodically sending a third electronic validation request to the third user within the third user set requiring the third user to respond to the third electronic validation request to validate the status of the second user; and wherein determining the validity of the status indication of the second user is further based on the receipt of a response from the third user to the third electronic validation request.

13. The method of electronically determining a status of multiple users of claim 12, wherein the second electronic validation request comprises the electronic validation request to the second user to validate the status of the third user.

14. The method of electronically determining a status of multiple users of claim 1, including sending the first and second electronic validation requests in an alternating manner at different times.

15. The method of electronically determining a status of multiple users of claim 1, wherein the first user is one of a manager or a direct report of the second user.

16. The method of electronically determining a status of multiple users of claim 1, including periodically sending the first and second electronic validation requests at the same periodic rate, but sending the first electronic validation requests offset in time from the second electronic validation requests by approximately one-half of the period associated with the periodic rate.

17. A method of electronically determining a status of multiple users within a computer network, the method comprising:

storing a status indication for each of a plurality of users having access to the computer network, the status indication for each particular one of the plurality of users including profile information for the particular user indicating access rights that the particular user has to one or more applications available via the computer network;

assigning each of the plurality of users to either a first user set or to a second user set;

automatically and periodically sending a first electronic validation request to each of one or more of the first users assigned to the first user set requiring the one or more first users within the first user set to respond to the first electronic validation requests to validate the status of at least one second user assigned to the second user set;

determining the validity of the status indication of at least one of the second users within the second user set based on the receipt of one or more responses to the first electronic validation requests;

automatically and periodically sending a second electronic validation request to each of one or more second users within the second user set requiring the one or more second users within the second user set to respond to the second electronic validation requests to validate the status of at least one first user assigned to the first user set;

determining the validity of the status indication of at least one of the first users within the first user set based on the receipt of one or more responses to the second electronic validation requests;

determining, for at least one of the first users within the first user set, whether to provide the at least one first user access to the one or more applications available via the computer network based on determining the validity of the status indication of the at least one first user; and determining, for at least one of the second users within the second user set, whether to provide the at least one second user access to the one or more applications available via the computer network based on determining the validity of the status indication of the at least one second user.

18. The method of electronically determining a status of multiple users of claim 17, wherein determining the validity of the status indication of one of the second users based on the receipt of the one or more responses to the first electronic validation requests includes determining whether one of the one or more responses to the first electronic validation requests was sent within a predetermined period of time.

19. The method of electronically determining a status of multiple users of claim 18, wherein determining the validity of the status indication of one of the first users based on the receipt of the one or more responses to the second electronic validation requests includes determining whether one of the one or more responses to the second electronic validation requests was sent within a second predetermined period of time.

20. The method of electronically determining a status of multiple users of claim 17, including storing for each of the plurality of users, first response information regarding a response to one of the first electronic validation requests and second response information regarding a response to one of the second electronic validation requests and determining the validity of the status indication of a particular one of the plurality of users at any particular time based on the first and second response information stored for the particular user at the particular time.

21. The method of electronically determining a status of multiple users of claim 20, wherein determining the validity of the status indication of the particular one of the plurality of users at any particular time based on the first and second response information includes determining if the response to one of the first electronic validation requests was received within a particular time period associated with the one of the first electronic validation requests.

22. The method of electronically determining a status of multiple users of claim 17, including sending the first electronic validation requests and sending the second electronic validation requests in an alternating manner at different times.

23. The method of electronically determining a status of multiple users of claim 17, wherein sending the first electronic validation request to each of one or more of the first users includes sending the status indication of at least one of the second users as part of at least one of the first electronic validation requests and wherein determining the validity of the status indication of the at least one of the second users includes determining whether the first user which received the at least one of the first electronic validation requests agrees with the status indication of at least one of the second users as sent within the at least one of the first electronic validation requests.

24. The method of electronically determining a status of multiple users of claim 17, further including determining the validity of the status indication of one of the first users based on the receipt of a response from the one of the first users to one of the first electronic validation requests sent to the one of the first users.

25. The method of electronically determining a status of multiple users of claim 17, including periodically sending the first electronic validation requests and the second electronic validation requests at the same periodic rate, but sending the first electronic validation requests offset from the second electronic validation requests in time by approximately one-half of the period associated with the periodic rate.

26. A user validation system for use in a computer network, the user validation system comprising:
- a user profile database storing, for each particular one of a plurality of users having access to the computer network, a status indication including profile information for the particular user indicating access rights that the particular user has to one or more applications available via the computer network;
- a validation database that associates each of the plurality of users to either a first user set or to a second user set so that first users are in the first user set and second users are in the second user set;
- a validation engine executing on a computing device that:
  - automatically and periodically sends a first electronic validation request to each of one or more of the first users in the first user set requiring each of the one or more first users in the first user set to respond to one of the first electronic validation requests to validate the status of at least one second user in the second user set;
  - automatically and periodically sends a second electronic validation request to each of one or more second users in the second user set requiring each of the one or more second users in the second user set to respond to one of the second electronic validation requests to validate the status of at least one first user in the first user set;
  - receives responses to the first electronic validation requests and to the second electronic validation requests;
  - stores indications in the validation database indicative of information associated with the receipt of the responses to the first electronic validation requests and the second electronic validation requests; and
  - determines the validity of the status indication of at least one of the plurality of users based on the stored information associated with the receipt of the responses to the first electronic validation requests and the second electronic validation requests associated with the at least one of the plurality of users; and
- a security engine executing on the computing device to allow or deny access of any particular one of the plurality of users to the one or more applications available via the computer network based on the determination, by the validation engine, of the validity of the status indication of the particular user.

27. The user validation system of claim 26, wherein the validation database includes, for each user, a response information field and wherein the validation engine stores, in the response information field for each of the first users, information pertaining to a response to one of the second electronic validation requests received from one of the second users.

28. The user validation system of claim 27, wherein the validation engine stores, in the response information field for each of the second users, information pertaining to a response to one of the first electronic validation requests from one of the first users.

29. The user validation system of claim 27, wherein the validation engine stores, in the response information field for each of the first users, information pertaining to when a response to the one of the second electronic validation requests was received from the one of the second users.

30. The user validation system of claim 26, wherein the validation database includes a response information field for each of the plurality of users, wherein the response information field for each one of the first users stores information pertaining to when one of the first electronic validation requests was sent to the one of the first users and information pertaining to when a response to the one of the first electronic validation requests was received from the one of the first users.

31. The user validation system of claim 30, wherein the validation engine determines the validity of the status indication of the one of the first users based on whether the response to the one of the first electronic validation requests sent to the one of the first users was received from the one of the first users within a predetermined time period associated with the one of the first electronic validation requests.

32. The user validation system of claim 26, wherein the validation engine generates and sends the first electronic validation requests at least once during each of a number of consecutive validation periods, and generates and sends the second electronic validation requests at least once during each of a number of consecutive validation periods and wherein the validation engine sends the first electronic validation requests at a time offset from the second electronic validation requests by about one-half of the validation period.

33. The user validation system of claim 26, wherein the validation engine generates and sends the first electronic validation requests at different times than the second electronic validation requests.

34. The user validation system of claim 26, wherein the validation engine determines the validity of the status indication of at least one of the first users based on whether a response to one of the second electronic validation requests was received from one of the second users within a predetermined time period associated with the one of the second electronic validation requests and further determines the validity of the status indication of one of the first users based on whether a response to one of the first electronic validation requests sent to the one of the first users was received from the one of the first users within a predetermined time period associated with the one of the first electronic validation requests.

35. The user validation system of claim 26, wherein the validation engine determines the validity of the status indication of at least one of the first users based on whether a response to one of the second electronic validation requests was received from one of the second users within a predetermined time period associated with the one of the second electronic validation requests.

36. The user validation system of claim 26, wherein the validation engine generates one of the first electronic validation requests to include a status indication of at least one of the second users and enables the first user receiving the one of the first electronic validation requests to agree with or disagree with the status indication of the at least one of the second users in the response to the one of the first electronic validation requests.

37. The user validation system of claim 26, wherein the validation engine generates each of the first electronic validation requests to include a status indication of at least one of the second users and enables the first users receiving the first electronic validation requests to indicate a new status indication of the at least one of the second users in the response to the first electronic validation request.

* * * * *

UNITED STATES PATENT AND TRADEMARK OFFICE
CERTIFICATE OF CORRECTION

PATENT NO.         : 8,285,845 B2                                      Page 1 of 1
APPLICATION NO.    : 13/053683
DATED              : October 9, 2012
INVENTOR(S)        : Joe Urbanek et al.

It is certified that error appears in the above-identified patent and that said Letters Patent is hereby corrected as shown below:

<u>In the Drawings:</u>

At Sheet 12, Fig. 12, "Helpdeak" should be -- Helpdesk --.

<u>In the Specification:</u>

At Column 4, line 33, "self validation" should be -- self-validation --.

At Column 10, line 14, "others'" should be -- other's --.

Signed and Sealed this
Fifth Day of August, 2014

Michelle K. Lee
*Deputy Director of the United States Patent and Trademark Office*